US012155449B2

(12) United States Patent
Wei et al.

(10) Patent No.: US 12,155,449 B2
(45) Date of Patent: Nov. 26, 2024

(54) BEAM MANAGEMENT FOR BANDWIDTH PART NOT INCLUDING SYNCHRONIZATION SIGNAL BLOCK

(71) Applicant: Qualcomm Incorporated, San Diego, CA (US)

(72) Inventors: Chao Wei, Beijing (CN); Ruiming Zheng, Beijing (CN); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 17/637,931

(22) PCT Filed: Aug. 28, 2020

(86) PCT No.: PCT/CN2020/112124
§ 371 (c)(1),
(2) Date: Feb. 24, 2022

(87) PCT Pub. No.: WO2021/037207
PCT Pub. Date: Mar. 4, 2021

(65) Prior Publication Data
US 2022/0286191 A1    Sep. 8, 2022

(30) Foreign Application Priority Data
Aug. 30, 2019 (WO) ................ PCT/CN2019/103643

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0626* (2013.01); *H04W 56/001* (2013.01); *H04W 68/005* (2013.01); *H04W 76/19* (2018.02)

(58) Field of Classification Search
CPC ..... H04B 7/088; H04B 7/0626; H04W 76/19; H04W 56/001; H04W 68/005
See application file for complete search history.

(56) References Cited

U.S. PATENT DOCUMENTS

| 2017/0078062 A1 | 3/2017 | Park et al. |
| 2018/0287683 A1 | 10/2018 | Subramanian et al. |

(Continued)

FOREIGN PATENT DOCUMENTS

| CN | 109076556 A | 12/2018 |
| CN | 109391965 A | 2/2019 |

(Continued)

OTHER PUBLICATIONS

Qualcomm Incorporated: "Enhancements on Multi-Beam Operation", 3GPP Draft, 3GPP TSG-RAN WG1 Meeting #98, R1-1909273, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 26, 2019-Aug. 30, 2019, Aug. 17, 2019 (Aug. 17, 2019), XP051765878, 19 Pages, Section 7.4, Sections 1.2.1, 7.1-7.6.

(Continued)

*Primary Examiner* — Derrick V Rose
(74) *Attorney, Agent, or Firm* — Holland & Hart LLP

(57) ABSTRACT

Methods, systems, and devices for wireless communications are described. A user equipment (UE) may communicate with a base station over a first bandwidth part (BWP) of a carrier. The UE may receive a beam failure recovery (BFR) configuration signal configuring a set of periodic channel state information reference signals (CSI-RSs) in the first BWP and a set of synchronization signals in a second BWP. The UE may measure the set of periodic CSI-RSs in the first BWP. The UE may set a beam for communicating with the base station over the first BWP based at least in part on the (Continued)

measuring. The UE may be a reduced bandwidth capability and support communicating with the base station using only one BWP.

24 Claims, 19 Drawing Sheets

(51) Int. Cl.
*H04W 56/00* (2009.01)
*H04W 68/00* (2009.01)
*H04W 76/19* (2018.01)

(56) References Cited

U.S. PATENT DOCUMENTS

| | | | |
|---|---|---|---|
| 2019/0103928 A1 | 4/2019 | Nagaraja et al. | |
| 2019/0222290 A1 | 7/2019 | Ly et al. | |
| 2019/0261244 A1 | 8/2019 | Jung et al. | |
| 2019/0313343 A1 | 10/2019 | Molavianjazi et al. | |
| 2020/0100311 A1* | 3/2020 | Cirik | H04W 72/23 |
| 2021/0204231 A1* | 7/2021 | Harada | H04W 72/0453 |

FOREIGN PATENT DOCUMENTS

| | | |
|---|---|---|
| CN | 110100492 A | 8/2019 |
| CN | 110114998 A | 8/2019 |
| EP | 3471332 A1 | 4/2019 |
| WO | WO-2018144873 A1 | 8/2018 |
| WO | WO-2019028850 A1 | 2/2019 |
| WO | WO-2019029597 A1 | 2/2019 |
| WO | WO-2019029711 A1 | 2/2019 |
| WO | WO-2019051177 A1 | 3/2019 |
| WO | WO-2019099659 A1 | 5/2019 |
| WO | WO-2019159004 A1 | 8/2019 |

OTHER PUBLICATIONS

Qualcomm Incorporated: "Measurement Reporting and Beam Refinement During Rach", 3GPP TSG-RAN WG2 Meeting #99bis, R2-1711350 (Resubmission of R2-1709088), 3rd Generation Partnership Project (3GPP), Mobile Competence Centre, 650, Route Des Lucioles, F-06921, Sophia-Antipolis Cedex, France, vol. RAN WG2, No. Prague, Czech, Oct. 9, 2017-Oct. 13, 2017, Oct. 8, 2017, XP051343338, pp. 1-6, Par.1, 2.

Supplementary European Search Report—EP20856440—Search Authority—Munich—Jan. 9, 2024.

Ericsson: "Maintenance for Beam Management", 3GPP Draft, 3GPP TSG-RAN WG1 Meeting #94, Tdoc R1-1809197, Maintenance for Beam Management, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516567, 10 pages, Retrieved from the Internet: URL: http://www.3gpp.org/ftp/tsg%5Fran/WG1%5FRL1/TSGR1%5F94/Docs/R1%2D1809197%2Ezip [retrieved on Aug. 11, 2018] the whole document.

International Search Report and Written Opinion—PCT/CN2019/103643—ISA/EPO—May 26, 2020.

International Search Report and Written Opinion—PCT/CN2020/112124—ISA/EPO—Nov. 27, 2020.

Supplementary Partial European Search Report—EP20856440—Search Authority—Munich—Aug. 7, 2023.

\* cited by examiner

BEAM MANAGEMENT FOR BANDWIDTH PART NOT INCLUDING SYNCHRONIZATION SIGNAL BLOCK

CROSS-REFERENCE TO RELATED APPLICATIONS

The present application is a 371 national stage filing of International PCT Application No. PCT/CN2020/112124 by Wei et al. entitled "BEAM MANAGEMENT FOR BANDWIDTH PART NOT INCLUDING SYNCHRONIZATION SIGNAL BLOCK," filed Aug. 28, 2020; and claims priority to International PCT Application No. PCT/CN2019/103643 by Wei et al. entitled "BEAM MANAGEMENT FOR BANDWIDTH PART NOT INCLUDING SYNCHRONIZATION SIGNAL BLOCK," filed Aug. 30, 2019, each of which is assigned to the assignee hereof, and each of which is expressly incorporated by reference in its entirety herein.

TECHNICAL FIELD

The following relates generally to wireless communications, and more specifically to beam management for a bandwidth part (BWP) not including a synchronization signal block (SSB).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support beam management for a bandwidth part (BWP) that does not include a synchronization signal block (SSB). Generally, the described techniques provide various mechanisms that support wireless communications over a carrier supporting multiple BWPs. Aspects of the described techniques may include associating one or more features, configurations, etc., of one BWP with a second BWP (and a third BWP, a fourth BWP, etc.). Broadly, aspects of the described techniques may support an association between the synchronization signals (such as SSBs) in one BWP with reference signals (such as channel state information reference signals (CSI-RSs)) in another BWP to support channel performance measurements, beam management/selection, and the like.

For example, a base station and UE may establish a connection over an initial BWP of a carrier. For example, the UE and base station may perform an initial connection procedure to establish the connection over the carrier in the initial BWP. The initial BWP may be considered an anchor BWP in this context and may include one or more synchronization signals (e.g., SSBs) transmitted over the carrier in the initial BWP. The base station may configure the UE for communications with a UE-specific radio resource control (RRC) configured BWP that does not include any synchronization signals (e.g., SSBs). The base station may configure the UE with a set of CSI-RSs in the UE-specific RRC configured BWP that are, at least in some aspects, associated with or otherwise related to the synchronization signals (e.g., SSBs) in the initial BWP. In this context, the initial BWP may be referred to as a second BWP and the UE-specific RRC configured BWP may be referred to as a first BWP. As one example, this may include the CSI-RSs in the first BWP being quasi-collocated (QCL or QCL'd) with the SSBs in the second BWP. In another example, a beam index associated with one of the SSBs in the second BWP (as reported by the UE) may be leveraged for configuring the reference signals in the first BWP. Accordingly, the UE may measure the CSI-RSs in the first BWP based on the association between the synchronization signals in the second BWP and the CSI-RSs in the first BWP. Based on this measurement, the UE and base station may set or otherwise select a beam for communicating over the first BWP.

Aspects of the described techniques may also be utilized during a beam failure recovery (BFR) event between the base station and UE. For example, the UE and/or base station may determine that a beam selected for communicating over the first BWP has suddenly failed, e.g., due to UE mobility, interference, blockage, etc. Accordingly, the base station may provide a BFR configuration signal to the UE that configures the periodic CSI-RSs in the first BWP as well as a set of synchronization signals in the second BWP. The UE may measure one or more CSI-RS in the set of periodic CSI-RSs in the first BWP. For example, the UE may measure each CSI-RS in the first BWP to identify a CSI-RS having a performance metric satisfying a threshold. Based on the identified CSI-RS, the UE and base station may select the new beam for communicating over the first BWP. If the UE and/or base station determines that the performance metric of none of the CSI-RSs in the set of periodic CSI-RSs satisfy the threshold, the base station and/or UE may switch to the second BWP where the UE can measure the synchronization signals in the set of the synchronization signals to identify a new beam for communicating in the first BWP. The UE and base station may then switch back over to the first BWP for the BFR procedure based on the identified synchronization signal having a performance metric satisfying the threshold.

A method of wireless communication at a UE is described. The method may include communicating with a base station over a first BWP of a carrier, receiving a BFR configuration signal configuring a set of periodic CSI-RSs in the first BWP and a set of synchronization signals in a second BWP, where the set of periodic CSI-RSs in the first BWP may be spatially separate from the synchronization signals in the second BWP, measuring the set of periodic CSI-RSs in the first BWP, and setting a beam for communicating with the base station over the first BWP based on the measuring.

An apparatus for wireless communication at a UE is described. The apparatus may include a processor, memory coupled (e.g., operatively, communicatively, functionally, electronically, or electrically) with the processor, and instructions stored in the memory. The instructions may be executable by the processor to cause the apparatus to communicate with a base station over a first BWP of a carrier, receive a BFR configuration signal configuring a set of periodic CSI-RSs in the first BWP and a set of synchronization signals in a second BWP, measure the set of periodic CSI-RSs in the first BWP, and set a beam for communicating with the base station over the first BWP based on the measuring.

Another apparatus for wireless communication at a UE is described. The apparatus may include means for communicating with a base station over a first BWP of a carrier, receiving a BFR configuration signal configuring a set of periodic CSI-RSs in the first BWP and a set of synchronization signals in a second BWP, measuring the set of periodic CSI-RSs in the first BWP, and setting a beam for communicating with the base station over the first BWP based on the measuring.

A non-transitory computer-readable medium storing code for wireless communication at a UE is described. The code may include instructions executable by a processor to communicate with a base station over a first BWP of a carrier, receive a BFR configuration signal configuring a set of periodic CSI-RSs in the first BWP and a set of synchronization signals in a second BWP, measure the set of periodic CSI-RSs in the first BWP, and set a beam for communicating with the base station over the first BWP based on the measuring.

Some examples of the method, apparatuses, and non-transitory computer-readable medium described herein may further include operations, features, means, or instructions for determining, based on the measuring, that a performance metric of the set of periodic CSI-RSs fails to satisfy a threshold, and initiating, based on the performance metric failing to satisfy the threshold, a switch to the second BWP.

Some examples of the method, apparatuses, and non-transitory computer-readable medium described herein may further include operations, features, means, or instructions for measuring the set of synchronization signals in the second BWP, determining a synchronization signal in the set of synchronization signals may have a performance metric satisfying the performance metric threshold, and transmitting a contention free random access in the first BWP for a BFR request based on a beam index of the synchronization signal.

In some examples of the method, apparatuses, and non-transitory computer-readable medium described herein, the synchronization signal includes an SSB in the second BWP.

In some examples of the method, apparatuses, and non-transitory computer-readable medium described herein, the first BWP may be non-overlapping with the second BWP.

In some examples of the method, apparatuses, and non-transitory computer-readable medium described herein, the UE includes a reduced bandwidth capability and supports communicating with the base station using only one BWP.

A method of wireless communication at a UE is described. The method may include communicating with a base station over a first BWP of a carrier, receiving a signal configuring a set of periodic CSI-RSs for the first BWP of the carrier, where each periodic CSI-RS of the set of periodic CSI-RSs is spatially quasi-collocated with a synchronization signal in a second BWP, measuring the set of periodic CSI-RSs in the first BWP based on the set of periodic CSI-RSs being spatially quasi-collocated with the synchronization signal in the second BWP, and determining a beam for communicating with the base station over the first BWP based on the measuring.

An apparatus for wireless communication at a UE is described. The apparatus may include a processor, memory coupled (e.g., operatively, communicatively, functionally, electronically, or electrically) with the processor, and instructions stored in the memory. The instructions may be executable by the processor to cause the apparatus to communicate with a base station over a first BWP of a carrier, receive a signal configuring a set of periodic CSI-RSs for the first BWP of the carrier, where each periodic CSI-RS of the set of periodic CSI-RSs is spatially quasi-collocated with a synchronization signal in a second BWP, measure the set of periodic CSI-RSs in the first BWP based on the set of periodic CSI-RSs being spatially quasi-collocated with the synchronization signal in the second BWP, and determine a beam for communicating with the base station over the first BWP based on the measuring.

Another apparatus for wireless communication at a UE is described. The apparatus may include means for communicating with a base station over a first BWP of a carrier, receiving a signal configuring a set of periodic CSI-RSs for the first BWP of the carrier, where each periodic CSI-RS of the set of periodic CSI-RSs is spatially quasi-collocated with a synchronization signal in a second BWP, measuring the set of periodic CSI-RSs in the first BWP based on the set of periodic CSI-RSs being spatially quasi-collocated with the synchronization signal in the second BWP, and determining a beam for communicating with the base station over the first BWP based on the measuring.

A non-transitory computer-readable medium storing code for wireless communication at a UE is described. The code may include instructions executable by a processor to communicate with a base station over a first BWP of a carrier, receive a signal configuring a set of periodic CSI-RSs for the first BWP of the carrier, where each periodic CSI-RS of the set of periodic CSI-RSs is spatially quasi-collocated with a synchronization signal in a second BWP, measure the set of periodic CSI-RSs in the first BWP based on the set of periodic CSI-RSs being spatially quasi-collocated with the synchronization signal in the second BWP, and determine a beam for communicating with the base station over the first BWP based on the measuring.

Some examples of the method, apparatuses, and non-transitory computer-readable medium described herein may further include operations, features, means, or instructions for identifying, based on the set of periodic CSI-RSs being spatially quasi-collocated with the synchronization signal, at least one of a paging resource, or a random access resource, or a combination thereof.

Some examples of the method, apparatuses, and non-transitory computer-readable medium described herein may further include operations, features, means, or instructions for receiving a reconfiguration signal reconfiguring the set of periodic CSI-RSs to be spatially quasi-collocated with a different synchronization signal in the second BWP, and setting the beam for communicating with the base station over the first BWP based on the reconfiguration signal.

Some examples of the method, apparatuses, and non-transitory computer-readable medium described herein may further include operations, features, means, or instructions for transmitting a capability signal to the base station indicating support for updating the spatial quasi-collocation association for the set of periodic CSI-RSs.

Some examples of the method, apparatuses, and non-transitory computer-readable medium described herein may further include operations, features, means, or instructions for determining that the set of periodic CSI-RSs in the first BWP may be not spatially quasi-collocated with the synchronization signal in the second BWP, receiving a configuration signal configuring an association between the set of periodic CSI-RSs and at least one of a set of paging resources, or a set of random access resources, or a combination thereof, and identifying, based on a beam index associated with a CSI-RS in the set of periodic CSI-RSs, at least one of a paging resource, or a random access resource, or a combination thereof.

In some examples of the method, apparatuses, and non-transitory computer-readable medium described herein, the synchronization signal includes an SSB in the second BWP.

In some examples of the method, apparatuses, and non-transitory computer-readable medium described herein, the first BWP may be non-overlapping with the second BWP.

In some examples of the method, apparatuses, and non-transitory computer-readable medium described herein, the UE includes a reduced bandwidth capability and supports communicating with the base station using only one BWP.

A method of wireless communication at a base station is described. The method may include communicating with a UE over a first BWP of a carrier, transmitting a BFR configuration signal configuring a set of periodic CSI-RSs in the first BWP and a set of synchronization signals in a second BWP, transmitting the set of periodic CSI-RSs in the first BWP, receiving a measurement report from the UE indicating a beam index associated with a synchronization signal of the set of synchronization signals, and setting a beam for communicating with the UE over the first BWP based on the measurement report.

An apparatus for wireless communication at a base station is described. The apparatus may include a processor, memory coupled (e.g., operatively, communicatively, functionally, electronically, or electrically) with the processor, and instructions stored in the memory. The instructions may be executable by the processor to cause the apparatus to communicate with a UE over a first BWP of a carrier, transmit a BFR configuration signal configuring a set of periodic CSI-RSs in the first BWP and a set of synchronization signals in a second BWP, transmit the set of periodic CSI-RSs in the first BWP, receive a measurement report from the UE indicating a beam index associated with a synchronization signal of the set of synchronization signals, and set a beam for communicating with the UE over the first BWP based on the measurement report.

Another apparatus for wireless communication at a base station is described. The apparatus may include means for communicating with a UE over a first BWP of a carrier, transmitting a BFR configuration signal configuring a set of periodic CSI-RSs in the first BWP and a set of synchronization signals in a second BWP, transmitting the set of periodic CSI-RSs in the first BWP, receiving a measurement report from the UE indicating a beam index associated with a synchronization signal of the set of synchronization signals, and setting a beam for communicating with the UE over the first BWP based on the measurement report.

A non-transitory computer-readable medium storing code for wireless communication at a base station is described. The code may include instructions executable by a processor to communicate with a UE over a first BWP of a carrier, transmit a BFR configuration signal configuring a set of periodic CSI-RSs in the first BWP and a set of synchronization signals in a second BWP, transmit the set of periodic CSI-RSs in the first BWP, receive a measurement report from the UE indicating a beam index associated with a synchronization signal of the set of synchronization signals, and set a beam for communicating with the UE over the first BWP based on the measurement report.

Some examples of the method, apparatuses, and non-transitory computer-readable medium described herein may further include operations, features, means, or instructions for configuring a threshold associated with a performance metric of the set of periodic CSI-RSs, and initiating, based on the performance metric failing to satisfy the threshold, a switch to the second BWP.

Some examples of the method, apparatuses, and non-transitory computer-readable medium described herein may further include operations, features, means, or instructions for transmitting the set of synchronization signals in the second BWP, and receiving a contention free random access in the first BWP for a BFR request indicating a beam index of a synchronization signal in the set of synchronization signals.

Some examples of the method, apparatuses, and non-transitory computer-readable medium described herein may further include operations, features, means, or instructions for resetting a beam for communicating with the UE over the first BWP based on the beam index of the synchronization signal.

In some examples of the method, apparatuses, and non-transitory computer-readable medium described herein, the synchronization signal includes an SSB in the second BWP.

In some examples of the method, apparatuses, and non-transitory computer-readable medium described herein, the first BWP may be non-overlapping with the second BWP.

A method of wireless communication at a base station is described. The method may include communicating with a UE over a first BWP of a carrier, transmitting a signal configuring a set of periodic CSI-RSs for the first BWP of the carrier, where each periodic CSI-RS of the set of periodic CSI-RSs is spatially quasi-collocated with a synchronization signal in a second BWP, receiving a measurement report from the UE indicating a beam index associated with a CSI-RS in the set of periodic CSI-RSs in the first BWP, and determining a beam for communicating with the UE over the first BWP based on the measurement report.

An apparatus for wireless communication at a base station is described. The apparatus may include a processor, memory coupled (e.g., operatively, communicatively, functionally, electronically, or electrically) with the processor, and instructions stored in the memory. The instructions may be executable by the processor to cause the apparatus to communicate with a UE over a first BWP of a carrier, transmit a signal configuring a set of periodic CSI-RSs for the first BWP of the carrier, where each periodic CSI-RS of the set of periodic CSI-RSs is spatially quasi-collocated with a synchronization signal in a second BWP, receive a measurement report from the UE indicating a beam index associated with a CSI-RS in the set of periodic CSI-RSs in the first BWP, and determine a beam for communicating with the UE over the first BWP based on the measurement report.

Another apparatus for wireless communication at a base station is described. The apparatus may include means for communicating with a UE over a first BWP of a carrier, transmitting a signal configuring a set of periodic CSI-RSs for the first BWP of the carrier, where each periodic CSI-RS of the set of periodic CSI-RSs is spatially quasi-collocated with a synchronization signal in a second BWP, receiving a measurement report from the UE indicating a beam index associated with a CSI-RS in the set of periodic CSI-RSs in the first BWP, and determining a beam for communicating with the UE over the first BWP based on the measurement report.

A non-transitory computer-readable medium storing code for wireless communication at a base station is described. The code may include instructions executable by a processor to communicate with a UE over a first BWP of a carrier, transmit a signal configuring a set of periodic CSI-RSs for the first BWP of the carrier, where each periodic CSI-RS of the set of periodic CSI-RSs is spatially quasi-collocated with a synchronization signal in a second BWP, receive a measurement report from the UE indicating a beam index associated with a CSI-RS in the set of periodic CSI-RSs in the first BWP, and determine a beam for communicating with the UE over the first BWP based on the measurement report.

Some examples of the method, apparatuses, and non-transitory computer-readable medium described herein may further include operations, features, means, or instructions for identifying, based on the set of periodic CSI-RSs being spatially quasi-collocated with the synchronization signal, at least one of a paging resource, or a random access resource, or a combination thereof, to use for communicating with the UE.

Some examples of the method, apparatuses, and non-transitory computer-readable medium described herein may further include operations, features, means, or instructions for transmitting a reconfiguration signal reconfiguring the set of periodic CSI-RSs to be spatially quasi-collocated with a different synchronization signal in the second BWP, and setting the beam for communicating with the base station over the first BWP based on the reconfiguration signal.

Some examples of the method, apparatuses, and non-transitory computer-readable medium described herein may further include operations, features, means, or instructions for receiving a capability signal from the UE indicating support for updating the spatial quasi-collocation association for the set of periodic CSI-RSs.

Some examples of the method, apparatuses, and non-transitory computer-readable medium described herein may further include operations, features, means, or instructions for determining that the set of periodic CSI-RSs in the first BWP may be not spatially quasi-collocated with (e.g., may be spatially separate from) the synchronization signal in the second BWP, transmitting a configuration signal configuring an association between the set of periodic CSI-RSs and at least one of a set of paging resources, or a set of random access resources, or a combination thereof, and identifying, based on a beam index associated with a CSI-RS of the set of periodic CSI-RSs, at least one of a paging resource, or a random access resource, or a combination thereof.

In some examples of the method, apparatuses, and non-transitory computer-readable medium described herein, the synchronization signal includes an SSB in the second BWP.

In some examples of the method, apparatuses, and non-transitory computer-readable medium described herein, the first BWP may be non-overlapping with the second BWP.

DETAILED DESCRIPTION

Figure 1:
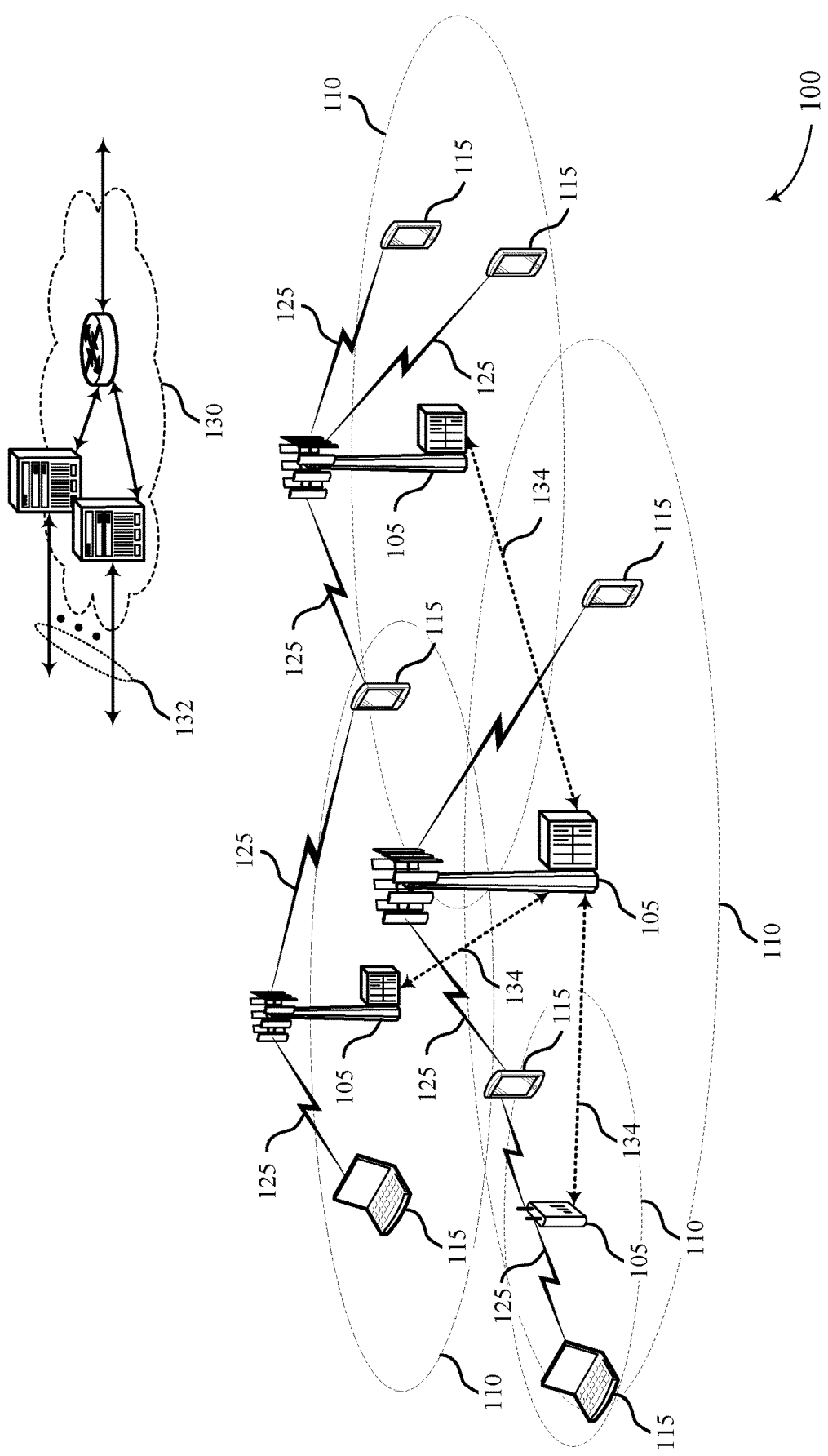
FIG. 1 illustrates an example of a system for wireless communications that supports beam management for a bandwidth part (BWP) not including a synchronization signal block (SSB) in accordance with aspects of the present disclosure.

Wireless communication systems may use a number of frequencies, subcarriers, etc., for wireless communications between a base station and user equipment (UE). The number of frequencies, subcarriers, etc., used by the wireless communication system may be considered the system bandwidth. However, some wireless communication systems may use a subset of the full system bandwidth, which may be referred to as a bandwidth part (BWP), for such wireless communications. Configuration of one or more BWPs may be done on a per-UE basis, in some examples. For example, one BWP may be an anchor or initial access BWP configured with various synchronization signals (e.g., synchronization signal blocks (SSBs)) that are used for initial access, paging, and the like for the UE and base station. The base station may configure the UE with additional BWP(s) in some examples, e.g., to support additional traffic being communicated between the base station and UE. In some wireless communication systems, the UE may perform wireless communications on the additional BWP(s) and the initial BWP, but only the initial BWP may be used for carrying synchronization signals that the UE uses for channel performance measurements, beam management, and the like. This may be problematic for some UEs, such as a UE configured with a reduced bandwidth capability that supports communicating with the base station using one BWP at a time. In this situation, a reduced bandwidth UE may not be able to communicate in the UE specific RRC configured BWP(s) while using the synchronization signals in the initial BWP for channel measurements, beam management, and the like. Should the UE periodically tune away from the UE specific RRC configured BWP(s) to the initial BWP for channel measurements, beam management, etc., this may result in a loss of and/or delay in communications between the UE and base station.

Aspects of the disclosure are initially described in the context of a wireless communication system. Generally, the described techniques provide various mechanisms that support wireless communications over a carrier supporting multiple BWPs. Aspects of the described techniques may include associating one or more features, configurations, etc., of synchronization signals (e.g., SSBs) in one BWP with reference signals in a UE specific RRC configured BWP. Broadly, aspects of the described techniques may support an association between the synchronization signals (such as an SSB) in the initial BWP with reference signals (such as channel state information reference signals (CSI-RSs) in a configured UE specific RRC configured BWP to support channel performance measurements, beam management/selection, and the like, for the UE and base station. For example, a base station and UE may establish a connection over a first BWP of a carrier. For example, the UE and base station may perform an initial connection procedure over an initial BWP to establish the connection over the carrier in the first BWP. The first BWP may be considered a non-anchor or UE specific RRC configured BWP in this context and may not include one or more synchronization signals (e.g., SSBs) transmitted over the carrier in the first BWP. Instead, the base station may configure the UE with a set of CSI-RSs in the first BWP that are, at least in some aspects, associated with the synchronization signals (e.g., SSBs) in the second BWP. As one example, this may include the CSI-RSs in the first BWP being quasi-collocated (QCL) with the SSBs in the second BWP. In another example, a beam index associated with one of the SSBs in the second BWP (as reported by the UE) may be leveraged when configuring the reference signals in the first BWP. Accordingly, the UE may measure the CSI-RSs in the first BWP based on the association between the synchronization signals in the second BWP and the CSI-RSs in the first BWP. Based on this measurement, the UE and base station may set or otherwise select a beam for communicating over the first BWP.

Aspects of the described techniques may also be utilized during a beam failure recovery (BFR) event between the base station and UE. For example, the UE and/or base station may determine that a beam selected for communicating over the first BWP has suddenly failed, e.g., due to mobility, interference, blockage, etc. Accordingly, the base station may provide a BFR configuration signal to the UE that configures the periodic CSI-RSs in the first BWP as well as a set of synchronization signals (e.g., SSBs) in the second BWP. Accordingly, the UE may measure one or more CSI-RS in the set of periodic CSI-RSs in the first BWP. For example, the UE may measure each CSI-RS in the first BWP to identify a CSI-RS having a performance metric satisfying a threshold. Based on the identified CSI-RS, the UE and base station may communicate over the first BWP. If the UE and/or base station determines that a performance metric of none of the CSI-RSs in the set of periodic CSI-RSs satisfy the threshold, base station and/or UE may switch to the second BWP where the UE can measure the synchronization signals in the set of the synchronization signals to identify a new beam for communicating in the first BWP. The UE and base station may then switch back to the first BWP for the BFR procedure based on the identified synchronization signal having a performance metric satisfying the threshold.

Aspects of the disclosure are further illustrated by and described with reference to apparatus diagrams, system diagrams, and flowcharts that relate to beam management for a BWP not including an SSB.

FIG. 1 illustrates an example of a wireless communication system 100 that supports beam management for a BWP not including an SSB in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may communicate with a base station over a first BWP of a carrier. The UE 115 may receive a beam failure recovery (BFR) configuration signal configuring a set of periodic CSI-RSs in the first BWP and a set of synchronization signals in a second BWP. The UE 115 may measure the set of periodic CSI-RSs in the first BWP. The UE 115 may set a beam for communicating with the base station 105 over the first BWP based at least in part on the measuring.

A UE 115 may communicate with a base station 105 over a first BWP of a carrier. The UE 115 may receive a signal configuring a set of periodic CSI-RSs for the first BWP of the carrier, wherein each periodic CSI-RS of the set of periodic CSI-RSs is spatially quasi-collocated with a synchronization signal in a second BWP. The UE 115 may measure the set of periodic CSI-RSs in the first BWP based at least in part on the set of periodic CSI-RSs being spatially quasi-collocated with the synchronization signal in the second BWP. The UE 115 may determine a beam for communicating with the base station 105 over the first BWP based at least in part on the measuring.

A base station 105 may communicate with a UE 115 over a first BWP of a carrier. The base station 105 may transmit a BFR configuration signal configuring a set of periodic CSI-RSs in the first BWP and a set of synchronization signals in a second BWP. The base station 105 may transmit the set of periodic CSI-RSs in the first BWP and the set of synchronization signals in the second BWP. The base station 105 may receive a measurement report from the UE 115 indicating a beam index associated with a synchronization signal of the set of synchronization signals or a set of CSI-RSs of the set of CSI-RSs. The base station 105 may set a beam for communicating with the UE 115 over the first BWP based at least in part on the measurement report.

A base station 105 may communicate with a UE 115 over a first BWP of a carrier. The base station 105 may transmit a signal configuring a set of periodic CSI-RSs for the first BWP of the carrier, wherein each periodic CSI-RS of the set of periodic CSI-RSs is spatially quasi-collocated with a synchronization signal in a second BWP. The base station 105 may receive a measurement report from the UE 115 indicating a beam index associated with a CSI-RS in the set of periodic CSI-RSs in the first BWP. The base station 105 may determine a beam for communicating with the UE 115 over the first BWP based at least in part on the measurement report.

Figure 2:
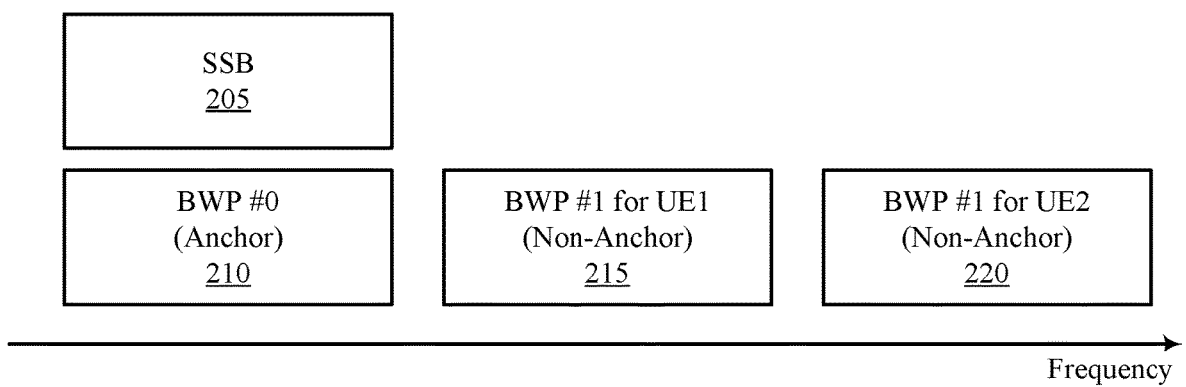
FIG. 2 illustrates an example of a BWP configuration that supports beam management for a BWP not including an SSB in accordance with aspects of the present disclosure.

FIG. 2 illustrates an example of a BWP configuration 200 that supports beam management for a BWP not including an SSB in accordance with aspects of the present disclosure. In some examples, BWP configuration 200 may implement aspects of wireless communication system 100. Aspects of BWP configuration 200 may be implemented by a base station and/or UE, each may be examples of the corresponding devices described herein.

Broadly, BWP configuration 200 illustrates an example where the system bandwidth is divided or otherwise allocated across three BWPs. Specifically, BWP configuration 200 includes BWP 210, BWP 215 configured for UE 1, and BWP 220 configured for UE 2. In this context, BWP 215 would be considered a UE specific RRC configured or first BWP from the perspective of UE 1, BWP 220 would be considered a UE specific RRC configured or first BWP from the perspective of UE 2, and BWP 210 may be considered a second BWP from the perspectives of UE 1 and UE 2. BWP 210 may be configured or otherwise include one or more synchronization signals, such as SSB 205. BWP 215 and BWP 220 may not be configured or otherwise include one or more synchronization signals, such as SSBs. It is to be understood that more or fewer than three BWPs may be utilized in accordance with aspects of the described techniques.

Generally, wireless communication systems may be configured or otherwise support very wideband operations, e.g., the channel bandwidth of a serving cell can be up to 100 MHz for frequency range one (FR1) and up to 400 MHz for frequency range two (FR2). However, due to the limited radio frequency (RF) capabilities, not all UEs can operate in a wideband mode, and the BWP provides a means of operating for UEs with a smaller bandwidth than the configured channel bandwidth. The UE can report the supported number of BWPs via capability signaling, but only one BWP can be active in the downlink and uplink for a given UE at any given time. That is, there is an initial active downlink/uplink BWP (e.g., BWP #0 of BWP 210) for a UE (which may be referred to as the active or access BWP) until the UE is explicitly configured with additional BWP(s) (such as BWP 215 and/or BWP 220) during or after the RRC connection is established. In some examples, the initial active downlink BWP (e.g., BWP 210) may be defined as the frequency location and bandwidth of a control resource set (CORESET) (e.g., CORESET #0) for the system information block (SIB) (e.g., SIB1). The initial active uplink BWP may be configured in the SIB (e.g., SIB1). The initial active uplink/downlink BWP may be confined within the UE's minimum bandwidth capability for the given frequency band.

In some wireless communication systems, there may be two options to configure the initial BWP (e.g., BWP 210) for the UE. A first option may include configuring BWP-DownlinkCommon and BWP-UplinkCommon in the ServingCellConfigCommon (SIB1), but not configuring dedicated configurations in BWP-DownlinkDedicated or BWP-UplinkDedicated in the ServingCellConfig (RRC). A second option may include configuring both BWP-DownlinkCommon and BWP-UplinkCommon in the ServiceCellConfigCommon and configuring dedicated configurations in at least one of BWP-DownlinkDedicated or BWP-UplinkDedicated in the ServingCellConfig. For the first option, the BWP #0 (e.g., BWP 210) may not be considered to be an RRC-configured BWP, e.g., the UE only supporting one BWP can still be configured with BWP #1 (e.g., BWP 215 and/or BWP 220) in addition to BWP #0 when using this configuration. For the second option, the BWP #0 (e.g., BWP 210) may be considered to be an RRC-configured BWP, e.g., the UE only supporting one BWP cannot be configured with BWP #1 in addition to BWP #0 when using this configuration.

Some usage scenarios identified for wireless communication systems may include, but are not limited to, eMBB, ultra-reliable/low-latency communications (URLLC), massive MTC (mMTC), etc., where mMTC may be associated with novel IoT use cases targeted in vertical industries, e.g., industrial centers, cameras, wearables, and the like. These use cases may motivate the introduction of a solution for low-end UE capabilities (e.g., a reduced bandwidth capability UE that supports communicating with the base station using only one BWP) as compared to other UEs. Such low-end UE capabilities may include, but are not limited to, a reduced number of antennas for a smaller UE form factor (e.g., one transmit/two receive antennas, one transmit/one receive antenna, etc.); UE bandwidth reduction as compared to eMBB, URLLC, etc., UEs; ultra-low UE power class for battery saving (e.g., 18 dBm peak power compared to 26 dBm); efficient coexistence with the existing eMBB/URLLC UEs since low-tier NR-Light (e.g., reduced capability NR) UEs and high-end eMBB/URLLC UEs may be deployed in the same cell and/or the same band; and the like. Therefore, the NR-Light UE (e.g., a UE having a reduced bandwidth capability that supports communicating with the base station using only one BWP) may only support one UE-specific RRC configured BWP having a narrow bandwidth based on the UE bandwidth as reported in the UE capability configuration signaling.

In the situation where the UE supports only one BWP, the bandwidth of the UE-specific configured BWP may include or otherwise be the bandwidth of the initial BWP and SSB (e.g., BWP 210 and SSB 205). This may be followed for both options one and two discussed above for BWP #0. For NR-Light, the bandwidth of the UE-specific RRC configured BWP may or may not include the bandwidth of the initial BWP (e.g., CORESET #0) and SSB. For example, this may be based on or otherwise due to the restriction on the supported maximum UE bandwidth and/or for traffic offloading by assigning different bandwidths to different NR-light UEs. In other words, the NR-light UEs in a connected mode may receive in a downlink BWP not including an SSB (e.g., BWP 215 and/or BWP 220) or transmit in an uplink BWP without physical random access channel (PRACH) occasions (e.g., BWP 215 and/or BWP 220).

This issue is highlighted in a narrowband IoT scenario in which the narrowband IoT UE can be configured with a non-anchor carrier for unicast transmission, but be required to switch to the anchor carrier for the radio resource management/radio link management (RRM/RLM) measurements and random access. However, different from narrowband IoT, NR-Light may need to support multi-beam operations, especially for FR2 for which the NR-Light UE needs to determine the appropriate transmit and receive beam by measuring SSBs (e.g., SSB 205) in the initial BWP (e.g., BWP 210). However, the periodic switching to the initial BWP (e.g., switching from BWP 215 or BWP 220 back to BWP 210) for measuring SSBs (e.g., based on a configured measurement gap) may not be a power efficient solution. In some wireless communication systems, the measurement gap may be used for intra-frequency and inter-frequency mobility measurements with the periodicity of 20, 40, 80, or 160 ms. The switch to the initial BWP also interrupts the ongoing downlink and/or uplink transmissions (e.g., in BWP 215 and/or BWP 220). It is, however, also not resource efficient to transmit the SSBs in every narrow bandwidth BWP configured for different NR-light UEs for beam management due to the very large SSB overhead.

Accordingly, aspects of the described techniques generally associate one or more reference signals (e.g., CSI-RSs) in BWP 215 and/or BWP 220 (e.g., the first BWPs from the perspective of the UE 1 and UE 2, respectively) with the synchronization signals (e.g., SSB 205) in BWP 210. In one example, the association may be based on the CSI-RSs in the first BWP (e.g., BWP 215 and/or BWP 220) having a QCL relationship with the synchronization signals (e.g., SSB 205) in the second BWP (e.g., BWP 210).

In some examples, this may include a set of periodic CSI-RS resources (that are not QCL'd with respect to QCL Type D) (e.g., spatial receive parameters) being used for beam management in the BWP that does not include an SSB (e.g., BWP 215 and/or BWP 220). For example, the CSI-RSs may be associated with a set of narrow transmit beams which are UE-specific and determined based on the initial reported SSB beam index during initial access. This may be required to support CSI-RS based contention-based RACH and paging if the contention based random access and paging are configured in the UE-specific BWP that does not include SSBs (e.g., BWP 215 and/or BWP 220). A direct association may be configured between the CSI-RS resource and the RACH occasion, e.g., defining a mapping between the CSI-RS resource index and one or more PRACH occasions. A direct association may be configured between the CSI-RS resource and a PDCCH monitoring occasion for a paging occasion, e.g., a one-to-one mapping between CSI-RS resource and PDCCH monitoring occasion of the paging occasion. In some aspects, the time/frequency resources for CSI-RS based random access and paging may be separately configured, e.g., different than the SSB-based random access and paging configuration.

For example, a base station and UE may be communicating over a first BWP of a carrier. For example, the UE may initially connect to the base station using BWP 210 (e.g., CORESET #0, SIB1, etc.). As discussed, the bandwidth of SSB 205 in BWP 210 may be configured or otherwise selected based on the supported bandwidth of the UE. During or after the connection procedure, the base station may configure the UE with a first BWP to use for communications (e.g., BWP 215 for UE 1 and BWP 220 for UE 2). Accordingly, the base station and UE (or UEs according to the example illustrated in FIG. 2) may be communicating over the first BWP of the carrier.

The base station may transmit (and the UE(s) may receive) a signal that configures a set of periodic reference signals (e.g., CSI-RSs) for the first BWP. As discussed, in one example each or all of the periodic CSI-RSs in the set of periodic CSI-RSs may be spatially QCL with a synchronization signal (e.g., at least one SSB in SSB 205) in the second BWP (e.g., BWP 210). In some aspects, the synchronization signal (e.g., SSB 205) in the second BWP (e.g., BWP 210) may use wide beams during transmission. The base station may configure the UE with the set of periodic CSI-RSs in the UE-specific RRC configured BWP for an NR-light UE to use for beam management.

In some wireless communication systems, for multiple beam operations in NR, the SSB-based PRACH and paging may be used, e.g., the PRACH occasions for contention-based RACH and paging occasions are associated with an SSB beam index. Since the resources of the CSI-RS and SSB are associated through the QCL association, the NR-light UE may determine the PRACH/paging occasion from the associated SSB beam index, e.g., there is no need for the UE to switch to BWP 210 (e.g., BWP #0) for SSB measurements.

In some aspects, a subset of SSBs are selected for the QCL association with the periodic non-zero power CSI-RS resources based on the UE capability and the total number of non-zero power CSI-RS resources. The subset of SSBs can be determined based on the initial transmit beam report from the UE during initial access, e.g., using neighboring SSB beam indices of the reported SSB beam index.

Accordingly, the UE may measure the set of periodic CSI-RSs in the first BWP (e.g., BWP 215 for UE 1 and BWP 220 for UE 2) based on the QCL association (or other association) between the set of periodic CSI-RSs in the first BWP and the synchronization signal(s) (e.g., the reported SSB beam index) in the second BWP. The UE may transmit (and the base station may receive) a measurement report indicating a beam index associated with the CSI-RS in the set of periodic CSI-RSs in the first BWP. For example, the UE may measure one or more of the CSI-RSs in the set of periodic CSI-RSs in the first BWP to identify at least one CSI-RS having a performance metric satisfying a threshold, e.g., having less than a threshold amount of interference, supporting a threshold amount of throughput, having less than the threshold amount of congestion, etc. The UE may report the beam index for the CSI-RS having the performance metric satisfying the threshold to the base station in the measurement report. Based on the measurement and/or corresponding measurement report, the base station and UE may communicate over the first BWP. That is, the base station and UE may leverage the link or association between the CSI-RSs in the first BWP (e.g., BWP 215 and/or BWP 220) and the SSB 205 in the second BWP (e.g., BWP 210) in order to perform beam management measurements in the first BWP. Accordingly, the base station and UE may continue to perform communications over the first BWP based on the selected beam, and update the selected beam as need based on the measurements of the set of periodic CSI-RSs.

Figure 3:
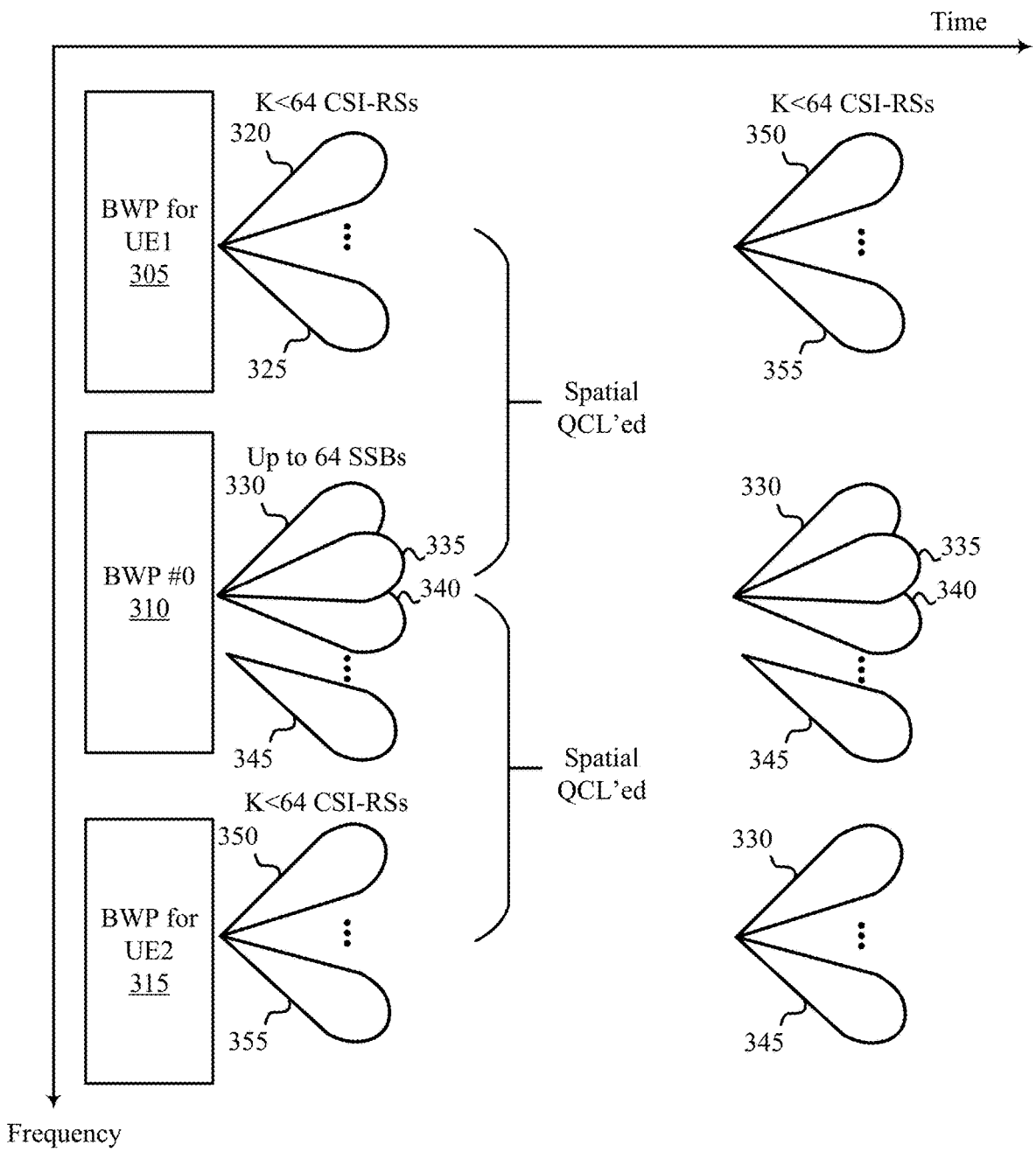
FIG. 3 illustrates an example of a BWP configuration that supports beam management for a BWP not including an SSB in accordance with aspects of the present disclosure.

FIG. 3 illustrates an example of a BWP configuration 300 that supports beam management for a BWP not including an SSB in accordance with aspects of the present disclosure. In some examples, BWP configuration 300 may implement aspects of wireless communication system 100 and/or BWP configuration 200. Aspects of BWP configuration 300 may be implemented by a base station and/or a UE, which may be examples of corresponding devices described herein.

As discussed above, the UE may initially connect to a base station using BWP 310 (e.g., an initial access BWP, such as BWP #0). For example, the UE may receive one or more synchronization signals (e.g., SSBs, SIB, etc.) in the BWP 310 during the initial access procedure. During and/or after the initial access procedure, the base station may configure the UE to operate with one or more additional BWPs, e.g., due to the UE having a limited bandwidth capability and/or only being able to communicate with the base station using one BWP at a time. In this context, BWP 305 may be considered the first BWP for UE 1 and BWP 315 may be considered the first BWP for UE 2, with BWP 310 being considered the second BWP for UE 1 and UE 2. Generally, the base station may configure up to 64 SSBs, by way of example only, for transmission in the second BWP (e.g., BWP 310). Each of the up to 64 SSBs may be transmitted/received in a beamformed manner using beams 330, 335, 340, 345, etc. In some examples, each SSB may be transmitted in a wide beam transmission.

The base station may transmit, and the UE may receive, a signal configuring a set of periodic CSI-RSs for the first BWP (e.g., BWP 305 or UE 1 and BWP 315 for UE 2). In some aspects, this may include configuring each UE with a K value of the CSI-RS resources, with K being less than 64. In some aspects, each CSI-RS in the set of periodic CSI-RSs may also be transmitted/received in a beamformed manner using one or more beams. For example, the set of periodic CSI-RSs configured for UE 1 in BWP 305 may be transmitted using beam 320 through beam 325 and the set of periodic CSI-RSS configured for UE 2 in BWP 315 may be transmitted using beam 350 through beam 355. Each UE may use a corresponding receive beam to receive these transmissions. As discussed above, there may be an association (e.g., a QCL relationship, a beam index association, etc.) between the synchronization signals (e.g., SSBs) in the second BWP (e.g., BWP 310) and the set of periodic CSI-RSs in the respective first BWP (e.g., BWP 305 for UE 1 and BWP 315 for UE 2). Accordingly, the UEs may perform periodic measurements of the CSI-RSs in the set of periodic CSI-RSs in the respective first BWPs, and report the results of the measurements to the base station in a measurement report. In some aspects, the measurement report may carry or convey an indication of a beam index associated with the CSI-RS in the set of periodic CSI-RSs in their respective first BWPs, which may be used to select, determine, or otherwise set a beam for communications between the UE and the base station over the first BWP.

In some examples, aspects of the described techniques may support the base station updating the association (e.g., the QCL association, beam index association, etc.) for the set of periodic CSI-RS resources. For example, since the UE may move out of the coverage area of the subset of SSBs (e.g., based on the SSB beam index initially reported by the UE during the initial connection procedure), it may be possible for the base station to update the QCL association, beam index association, etc., for the set of periodic CSI-RSs. In some examples, the update command may be a MAC CE signal transmitted by the base station. In some aspects, the UE may also indicate its capability for supporting the QCL update for the periodic CSI-RS resources, including the supported updating periodicity.

For example, initially the set of periodic CSI-RSs configured for UE 1 in BWP 305 may be QCL'd with respect to one or more of the synchronization signals (e.g., SSBs) in BWP 310. Similarly, initially the set of periodic CSI-RSs configured for UE 2 in BWP 315 may be QCL'd with respect to one or more of the synchronization signals (e.g., SSBs) in BWP 315. The QCL relationship may refer to the periodic CSI-RSs being transmitted using the same transmit beam, transmit direction, transmit angle, beam width, and the like, as the corresponding synchronization signal(s) in the BWP 310. For example, one or more antenna configurations, weighting factors, digital and/or analog parameters, etc., used for transmitting the SSB in BWP 310 may be similar or substantially the same as is used for transmitting the CSI-RSs in the set of periodic CSI-RSs in BWP 305 and BWP 315. Accordingly and initially, UE 1 may use beams 320 and 325 based on these beams having a spatial QCL relationship with one or more beams used for transmitting SSBs in BWP 310. Similarly, UE 2 may use beams 350 and 355 based on these beams having a spatial QCL relationship with one or more beams used for transmitting SSBs in BWP 310.

However, UE 1 and/or UE 2 may periodically and/or as needed update the spatial QCL for their respective set of periodic CSI-RSs. The update may be due to UE mobility, interference, blockage, etc., such that the information indicated in the measurement report of the CSI-RS provided by each UE may suggest or otherwise indicate that the spatial QCL relationship for the set of periodic CSI-RSs needs to be updated. For example, the measurement report may indicate that none of the CSI-RS in the set of periodic CSI-RSs have a performance metric satisfying a threshold. Accordingly, this may signal to the base station and UE that the spatial QCL relationship for the set of periodic CSI-RS is due to be updated.

Accordingly, the base station may transmit a reconfiguration signal to the UE reconfiguring the set of periodic CSI-RSs to be spatially QCL with a different synchronization signal (e.g., a different subset of SSBs) in the BWP 310. In some aspects, the different synchronization signal may refer to a different SSB transmitted using a different beam, with the different beam having a channel performance metric satisfying a threshold. Based on the reconfiguration signal, the UE and base station may set a new beam for communications over the first BWP (e.g., BWP 305 or UE 1 and BWP 315 for UE 2). In the example illustrated in BWP configuration 300, this may include UE 1 updating its beams for communications in BWP 305 from beam 320 and beam 325 to beam 350 and beam 355. In this example, this may include UE 2 updating its beams for communications in BWP 315 from beam 350 and beam 355 to beam 330 and beam 345. Accordingly, the base station and UE may periodically update their respective beams (e.g., perform beam management) based on measurements of the CSI-RSs in the set of periodic CSI-RSs configured for each respective UE in their first BWP (e.g., BWP 305 or UE 1 and BWP 315 for UE 2).

Figure 4:
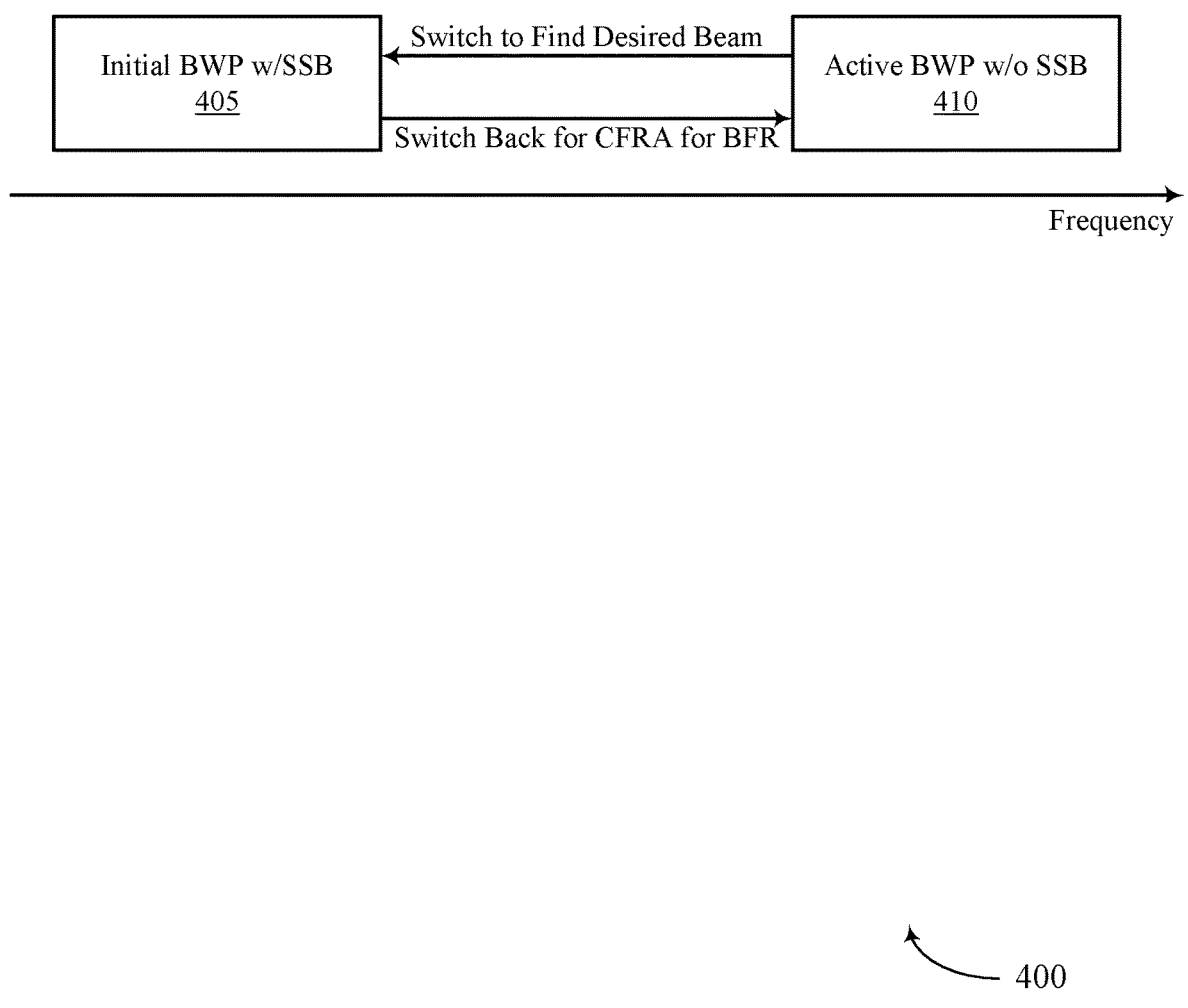
FIG. 4 illustrates an example of a BWP configuration that supports beam management for a BWP not including an SSB in accordance with aspects of the present disclosure.

FIG. 4 illustrates an example of a BWP configuration 400 that supports beam management for a BWP not including an SSB in accordance with aspects of the present disclosure. In some examples, BWP configuration 400 may implement aspects of wireless communication system 100 and/or BWP configurations 200 and/or 300. Aspects of BWP configuration 400 may be implemented by a UE and/or base station, which may be examples of the corresponding devices described herein.

As discussed, a UE may connect to a base station on an initial BWP 405 (e.g., BWP #0) that includes one or more SSBs transmitted in the initial BWP 405. During the initial connection or after, the base station may configure the UE with one or more UE specific RRC configured BWPs 410 that are not configured with SSBs. In this context, initial BWP 405 may be considered a second BWP for the UE and activated BWP 410 may be considered a first BWP for the UE. However, in some examples the UE may be a low tear UE having a reduced capability bandwidth and may support communicating with the base station using only one BWP at a time. Accordingly, the base station may transmit a signal to the UE configuring a set of periodic CSI-RSs for the UE specific RRC configured BWP 410 wherein there is at least some degree of association between the synchronization signals (e.g., SSBs) in the initial BWP 405 and the configured set of periodic CSI-RSs in the UE specific RRC configured BWP 410. The UE may, based on the association, measure one or more of the CSI-RSs in the set of periodic CSI-RSs to monitor and, if needed, update the beam determined, selected, or otherwise set for communicating with the base station based on the measurement report from the UE.

However, in some examples the UE may be unable to update or otherwise reconfigure its beam for communicating in the UE specific RRC configured BWP 410 based on the association between the synchronization signals in the initial BWP 405 and the set of periodic CSI-RSs in the UE specific RRC configured BWP 410. For example, the UE and/or base station may experience a beam failure event due to UE mobility, blockage, etc. In another example, the UE may not support updating the spatial QCL association for the set of periodic CSI-RSs, e.g., due to a different coverage areas between the CSI-RS in the UE specific RRC configured BWP 410 and the SSB in the initial BWP 405. The UE may not find (e.g., may not have enough time to find) a desired candidate beam when the beam failure is detected, e.g., due to the layer 1 reference signal received power (RSRP) of all of the CSI-RS resources in the UE specific RRC configured BWP 410 failing to satisfy a threshold.

In some wireless communication systems, an advanced UE may switch to the initial BWP 405 for a beam failure recovery (BFR) request, but again this requires the UE to be able to support multiple BWP configurations. That is, in some wireless communication systems, if the current active BWP 410 has BFR candidate beams, the UE may be configured to stay in the current BWP (e.g., active BWP 410) to perform the BFR procedure to identify a new candidate beam for communications in the active BWP 410. For a UE that is not capable of BWP switching, the RRC configured BWP may include the bandwidth of the initial BWP 405 and SSBs since the UE has a larger bandwidth capability. However, for an NR-Light UE (e.g., the UE having a reduced bandwidth capability and/or supporting communicating with the base station using only one BWP), if the UE supports a single BWP which does not include the SSB, the UE may perform the BFR in the configured BWP (e.g., UE specific RRC configured BWP 410). However, the UE may not be successful due to the link quality of all of the CSI-RS candidate beams being worse than a threshold (e.g., failing to satisfy a threshold). In this situation, a radio link failure (RLF) may be initiated, which is not preferred due to the RRC reconfiguration, additional overhead, delays, etc. Accordingly, aspects of the described techniques provide for enhancement for BFR for NR-Light.

For example, a base station and UE may be communicating over a first BWP (e.g., the UE specific RRC configured BWP 410) of a carrier. The base station and/or UE may determine or otherwise detect that a beam failure event has occurred with respect to the beam(s) being used for communications over the first BWP. Accordingly, the base station may transmit a BFR configuration signal to the UE that configures a set of periodic CSI-RSs in the first BWP (e.g., UE specific RRC configured BWP 410) and a set of synchronization signals in the second BWP (e.g., a subset of the SSBs in the initial BWP 405). The set of periodic CSI-RSs configured in the first BWP may be associated with a different set of synchronization signals configured in the second BWP. The base station may then transmit the configured set of periodic CSI-RSs in the first BWP (e.g., UE specific RRC configured BWP 410) and the set of synchronization signals in the second BWP (e.g., in the initial BWP 405).

In some aspects, the base station configuring the UE with the set of periodic CSI-RSs in the first BWP and the set of synchronization signals in the second BWP may include the base station identifying an association between each respective signal. For example, the base station may inform the UE that a first synchronization signal (e.g., SSB) in the second BWP is associated with (e.g., as a QCL relationship, based on the beam index, etc.) a corresponding periodic CSI-RS(s) in the first BWP. Accordingly, the UE may measure the CSI-RSs in the set of periodic CSI-RSs in the first BWP to identify a new candidate beam. Accordingly, if the UE determines that the beam for the first CSI-RS in the first BWP satisfies a threshold, the UE may signal the beam index for the beam for the first CSI-RS in the measurement report to the base station. That is, the UE may determine that a beam X is the best candidate beam from the CSI-RSs in the set of periodic CSI-RSs and signal the beam index for beam X to the base station in the measurement report. In this situation, the UE and base station may select beam X as the new beam for communicating over the first BWP.

However, in some examples the UE may determine that the performance metric of each CSI-RS in the configured set of periodic CSI-RS fails to satisfy the threshold. In this example (as is shown in FIG. 4), the UE may initiate switch to the second BWP (e.g., the initial BWP 405) in order to find a desired beam (e.g., a new candidate beam). For example, the UE may measure the synchronization signals in the set of configured synchronization signals (e.g., SSBs) in the second BWP and identify at least one synchronization signal having a performance metric satisfying the threshold. Accordingly, the UE may switch back to the first BWP (e.g., the UE specific RRC configured BWP 410) for a BFR request based on the beam index of the synchronization signal having the performance metric satisfying the threshold. Accordingly, the UE may transmit a contention free random access message in the first BWP based on the measurements in the second BWP identifying at least one synchronization signal having a performance metric satisfying the threshold.

Accordingly, the candidate reference beams for BFR may include both the set of periodic CSI-RS resources in the first BWP and the SSBs in the second BWP that are not QCL associated with the periodic CSI-RS resources. After the beam failure is detected, if the layer 1 of an RSRP of all the periodic CSI-RS resources failed to satisfy the threshold, the MAC entity in the UE may initiate a switch to the initial BWP 405 and request the physical layer in the UE to assess the link quality of the SSBs in the initial BWP 405 and select a desired SSB beam with the corresponding layer 1 RSRP above the threshold as the new serving beam. Then, the UE may switch back to its RRC configured BWP (e.g., UE specific RRC configured BWP 410) to transmit a dedicated preamble in the RACH occasion that corresponds to the selected beam since there is no contention free RACH resources in BWP #0 (e.g., initial BWP 405) for the beam failure recovery request. The UE will monitor the BFR search space on PDCCH for any message addressed to its identifier (e.g., cellular radio network temporary identifier (C-RNTI)) assuming the same antenna port QCL parameters as the selected beam (e.g., as the beam corresponding to the synchronization signal in the initial BWP 405 having a performance metric satisfying the threshold).

Figure 5:
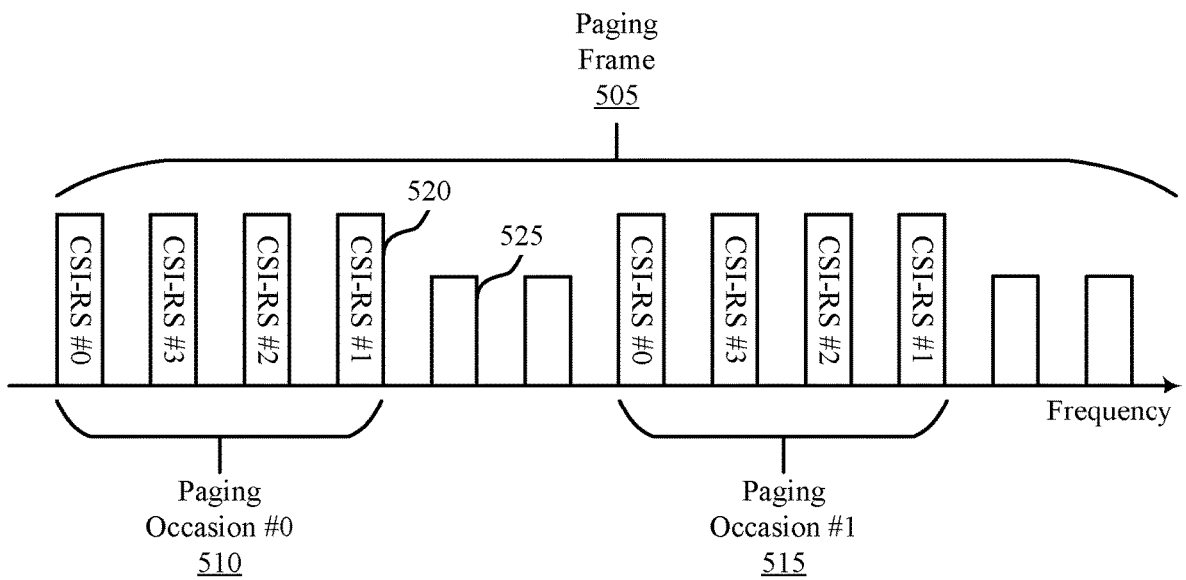
FIG. 5 illustrates an example of a BWP configuration that supports beam management for a BWP not including an SSB in accordance with aspects of the present disclosure.

FIG. 5 illustrates an example of a BWP configuration 500 that supports beam management for a BWP not including an SSB in accordance with aspects of the present disclosure. In some examples, BWP configuration 500 may implement aspects of wireless communication system 100 and/or BWP configurations 200, 300, and/or 400. Aspects of BWP configuration 500 may be implemented by a base station and/or a UE, which may be examples of the corresponding devices described herein. Broadly, BWP configuration 500 illustrates one example of CSI-RS based paging in accordance with aspects of the described techniques.

BWP configuration 500 illustrates one example of a paging frame 505 having paging occasion #0 510 and paging occasion #1 515 in the first BWP. As discussed above, for SSB-based paging and random access, the UE may identify, based on the set of periodic CSI-RSs in the first BWP being spatially QCL with the synchronization signal in the second BWP, a paging resource and/or a random access resource.

In some wireless communication systems, the UE determines paging frame 505 and paging occasion 510 and/or 515 based on the UE identifier (e.g., C-RNTI) and the cell specific paging configuration, e.g., based on the configured paging periodicity (T), the total paging frames in T, and the number of paging occasions per paging frame (Ns). For SSB-based paging, if the paging search space is not searchSpace #0, the UE monitors the $(i\_s+1)^{th}$ paging occasion in the paging frame. A paging occasion is a set of 'S' consecutive PDCCH monitoring occasions, where 'S' is the number of actually transmitted SSBs. The $K^{th}$ PDCCH monitoring occasion for paging in the paging occasion corresponds to the $K^{th}$ transmitted SSB. The set of PDCCH monitoring occasions and the selection of the PDCCH monitoring occasion for the reception of the paging message is up to the UE implementation, e.g., based on the selected SSB beam index. However, in accordance with aspects of the described techniques for CSI-RS-based paging, a direct association between the CSI-RS resource in the PDCCH monitoring occasion for a paging occasion may be configured.

Accordingly, when the base station configures the UE with the set of periodic CSI-RSs in the first BWP that are spatially QCL with the synchronization signals (e.g., SSB) in the second BWP, the UE may receive a configuration signal configuring an association between the set of periodic CSI-RSs and at least one of a set of paging resources and/or random access resources. The UE may use this information to identify the paging and/or a random access resources in the first BWP. For example, the UE may identify the CSI-RS resources 520 (with only one CSI-RS resource 520 being labeled for ease of reference) in the first BWP and determine that these resources correspond to paging occasion #0 510 and paging occasion #1 515. Resources 525 generally illustrate non-CSI-RS resources used for communicating in the first BWP. Accordingly, the UE may use the configured CSI-RS resources 520 to identify where to monitor for paging signals in the first BWP. That is, CSI-RS resources 520 corresponding to CSI-RS #0, #3, #2, and #1 may constitute a PDCCH monitoring occasion for paging reception for the UE. This may avoid the situation where the UE must return or switch back to the second BWP for determining an SSB index for paging, random access, and the like.

Figure 6:
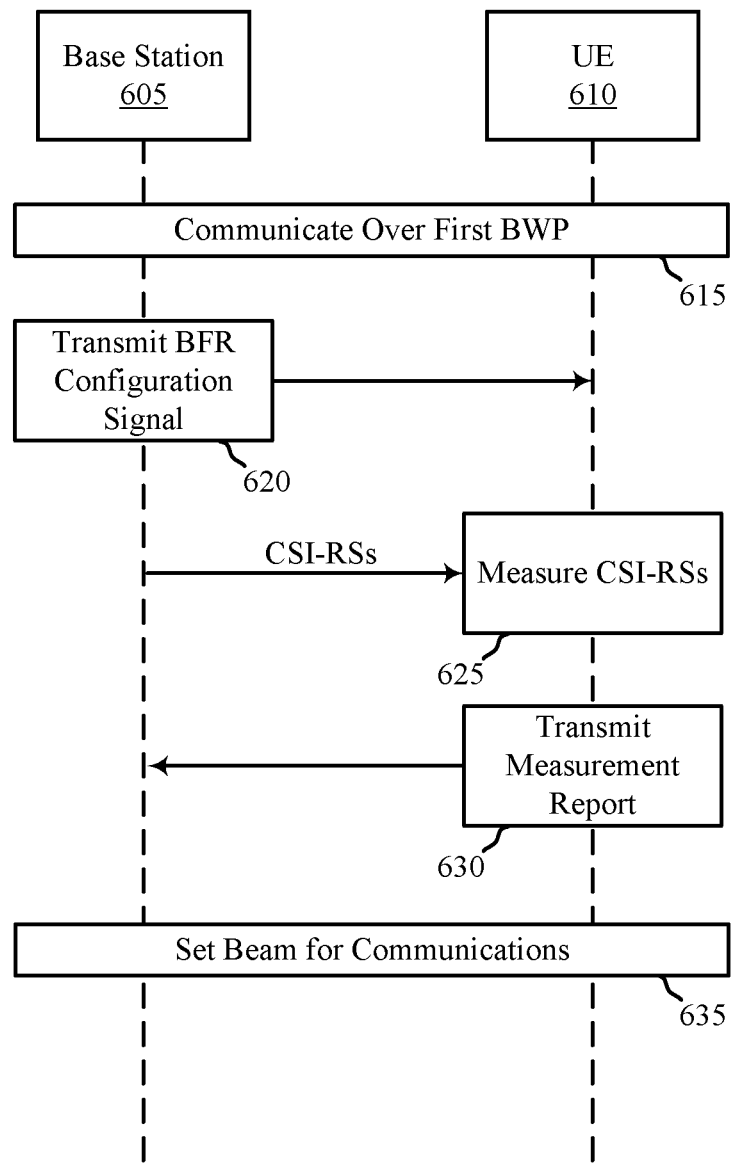
FIG. 6 illustrates an example of a process that supports beam management for a BWP not including an SSB in accordance with aspects of the present disclosure.

FIG. 6 illustrates an example of a process 600 that supports beam management for a BWP not including an SSB in accordance with aspects of the present disclosure. In some examples, process 600 may implement aspects of wireless communication system 100 and/or BWP configurations 200, 300, 400, and/or 500. Aspects of process 600 may be implemented by base station 605 and/or UE 610, which may be examples of the corresponding devices described herein. In some aspects, UE 610 is a reduced bandwidth capability UE that supports communicating with base station 605 using only one BWP at a time.

At 615, base station 605 and UE 610 may be communicating over a first BWP of a carrier. The first BWP may be a UE-specific RRC configured BWP that does not include synchronization signals (e.g., SSBs). The communications over the first BWP may include uplink communications and/or downlink communications.

At 620, base station 605 may transmit (and UE 610 may receive) a BFR configuration signal configuring a set of periodic CSI-RSs in the first BWP and a set of synchronization signals (e.g., SSBs) in a second BWP. In some aspects, the second BWP and the first BWP may be non-overlapping BWPs, e.g., non-overlapping in the frequency domain.

At 625, UE 610 may measure the set of periodic CSI-RSs in the first BWP that are transmitted by the base station 605. In some aspects, this may include UE 610 determining that, based on the measuring, a performance metric of the set of periodic CSI-RSs failed to satisfy a threshold. Accordingly, UE 610 may initiate a switch to the second BWP based on the performance metric failing to satisfy the threshold. UE 610 may measure the set of synchronization signals in the second BWP and determine that a synchronization signal from the set of synchronization signals that has a performance metric satisfying the threshold. UE 610 may then switch back to the first BWP and transmit a contention free random access in the first BWP for a BFR request based on the beam index of the synchronization signal having the performance metric that satisfies the threshold.

In some aspects, this may include base station 605 configuring UE 610 with a threshold associated with a performance metric of the set of periodic CSI-RSs. Based on a performance metric for the set of periodic CSI-RSs failing to satisfy the threshold, base station 605 may also initiate a switch to the second BWP. Accordingly, base station 605 may transmit the set of synchronization signals in the second BWP and then receive a contention free random access message from the UE 610 in the first BWP for a BFR request. The contention free random access message may carry or otherwise convey an indication of a beam index of a synchronization signal in the set of synchronization signals, e.g., a beam index of the synchronization signal having the performance metric that satisfies a threshold. Base station 605 may reset the beam for communicating with UE 610 over the first BWP based on the beam index of the synchronization signal.

At 630, UE 610 may transmit (and base station 605 may receive) a measurement report indicating a beam index associated with a synchronization signal in the set of synchronization signals. At 635, base station 605 and UE 610 may set a beam for communications over the first BWP based at least in part on a measurement report, e.g., based on the indicated beam index carried in the measurement report.

Figure 7:
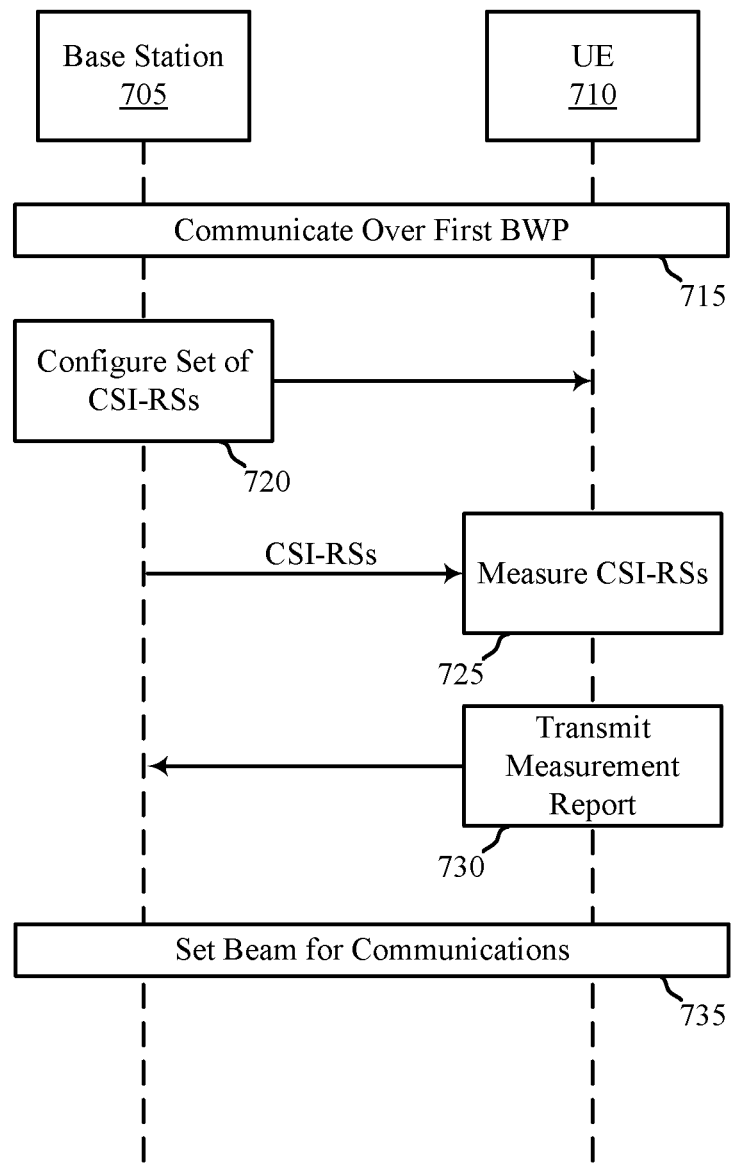
FIG. 7 illustrates an example of a process that supports beam management for a BWP not including an SSB in accordance with aspects of the present disclosure.

FIG. 7 illustrates an example of a process 700 that supports beam management for a BWP not including an SSB in accordance with aspects of the present disclosure. In some examples, process 700 may implement aspects of wireless communication system 100 and/or BWP configurations 200, 300, 400, and/or 500. Aspects of process 700 may be implemented by a base station 705 and/or UE 710, which may be examples of corresponding devices described herein. In some aspects, UE 710 may be a reduced bandwidth capability UE that supports communicating with base station 705 using only one BWP at a time.

At 715, base station 705 and UE 710 may communicate over a first BWP of the carrier. For example, UE 710 may establish a connection with base station 705 using an initial BWP (e.g., a second BWP), with base station 705 configuring UE for communications over the first BWP during or after the connection establishment procedure. In some aspects, this may include UE 710 transmitting (and base station 705 receiving) a capability signal indicating support for updating a spatial QCL association for the set of periodic CSI-RSs.

At 720, base station 705 may transmit (and UE 710 may receive) a signal configuring a set of periodic CSI-RSs for the first BWP, with each periodic CSI-RS of the set of periodic CSI-RSs being spatially QCL with a synchronization signal (or one or more synchronization signals) in the second BWP. In some aspects, this may include UE 710 identifying, based at least in part on the spatial QCL relationship between the set of periodic CSI-RSs and the synchronization signal, a paging resource and/or a random access resource in the first BWP. In some aspects, this may include base station 705 transmitting (and UE 710 receiving) a reconfiguration signal reconfiguring the set of periodic CSI-RSs to be spatially QCL with a different synchronization signal in the second BWP. Base station 705 and UE 710 may set the beam for communications over the first BWP based on the reconfiguration signal.

At 725, UE 710 may measure the set of periodic CSI-RSs in the first BWP transmitted by base station 705 based at least in part on the spatial QCL relationship between the set of periodic CSI-RSs and the synchronization signal in the second BWP. In some aspects, this may include UE 710 determining that the set of periodic CSI-RSs in the first BWP are not spatially QCL with the synchronization signal in the second BWP. Accordingly, base station 705 may transmit (and UE 710 may receive) a configuration signal configuring an association between the set of periodic CSI-RSs and at least one of a set of paging resources and/or a set of random access resources. Base station 705 and UE 710 may identify, based on the beam index associated a CSI-RS in the set of periodic CSI-RSs, a paging resource and/or a random access resource in the first BWP.

At 730, UE 710 may transmit (and base station 705 may receive) a measurement report that carries or conveys an indication of a beam index associated with a CSI-RS in the set of periodic CSI-RSs in the first BWP. At 735, base station 705 and UE 710 may determine the beam for communications over the first BWP based at least in part on the measurement report.

Figure 8:
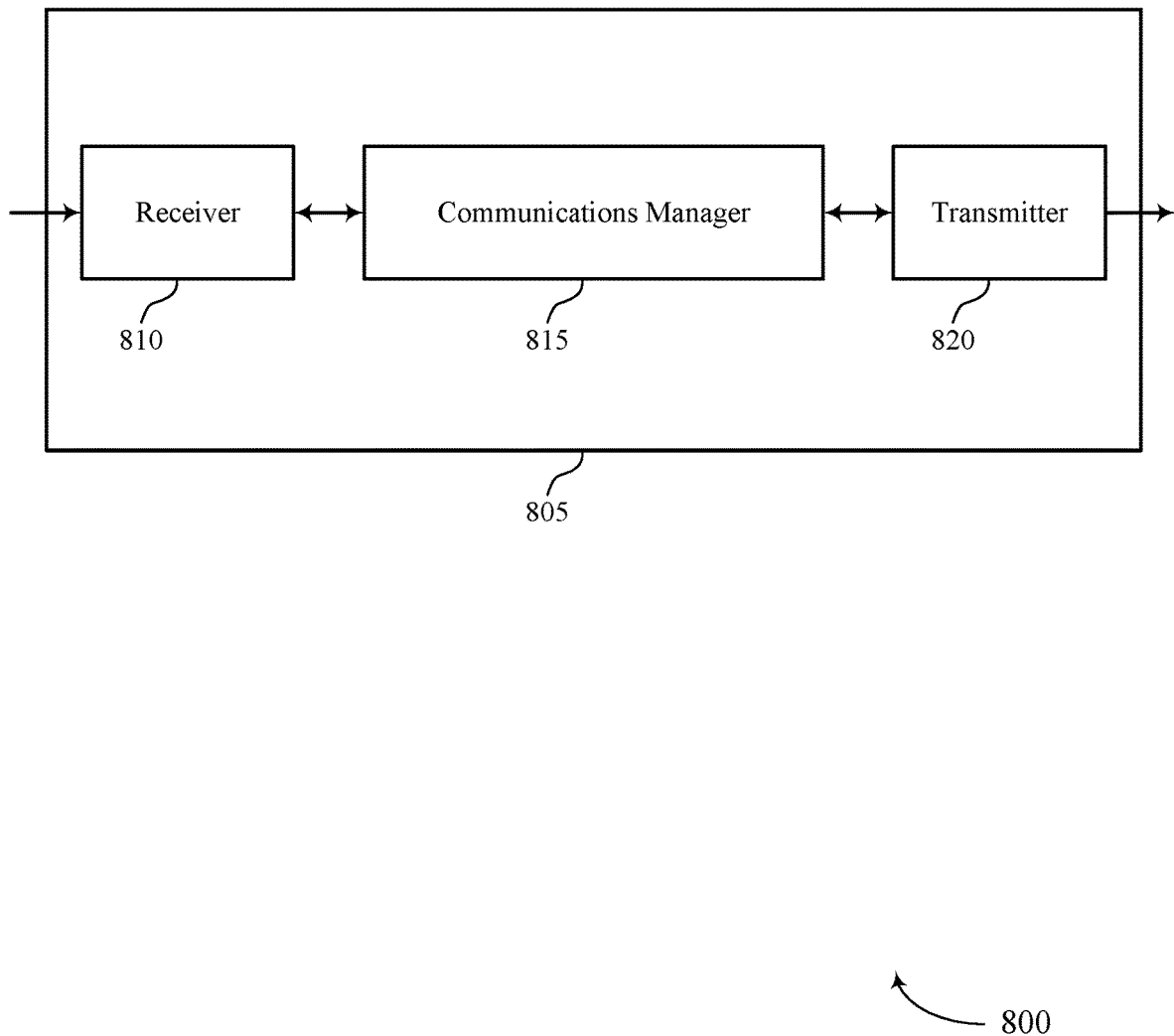
FIGS. 8 and 9 show block diagrams of devices that support beam management for a BWP not including an SSB in accordance with aspects of the present disclosure.

FIG. 8 shows a block diagram 800 of a device 805 that supports beam management for a BWP not including an SSB in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beam management for a BWP not including an SSB, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may communicate with a base station over a first BWP of a carrier, set a beam for communicating with the base station over the first BWP based on the measuring, receive a BFR configuration signal configuring a set of periodic CSI-RSs in the first BWP and a set of synchronization signals in a second BWP, where the set of periodic CSI-RSs in the first bandwidth part are spatially separate from the synchronization signals in the second bandwidth part, and measure the set of periodic CSI-RSs in the first BWP. The communications manager 815 may also communicate with a base station over a first BWP of a carrier, determine a beam for communicating with the base station over the first BWP based on the measuring, receive a signal configuring a set of periodic CSI-RSs for the first BWP of the carrier, where each periodic CSI-RS of the set of periodic CSI-RSs is spatially quasi-collocated with a synchronization signal in a second BWP, and measure the set of periodic CSI-RSs in the first BWP based on the set of periodic CSI-RSs being spatially quasi-collocated with the synchronization signal in the second BWP. The communications manager 815 may be an example of aspects of the communications manager 1110 described herein.

The communications manager 815, or its sub-components, may be implemented in hardware, software (e.g., executed by a processor), or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
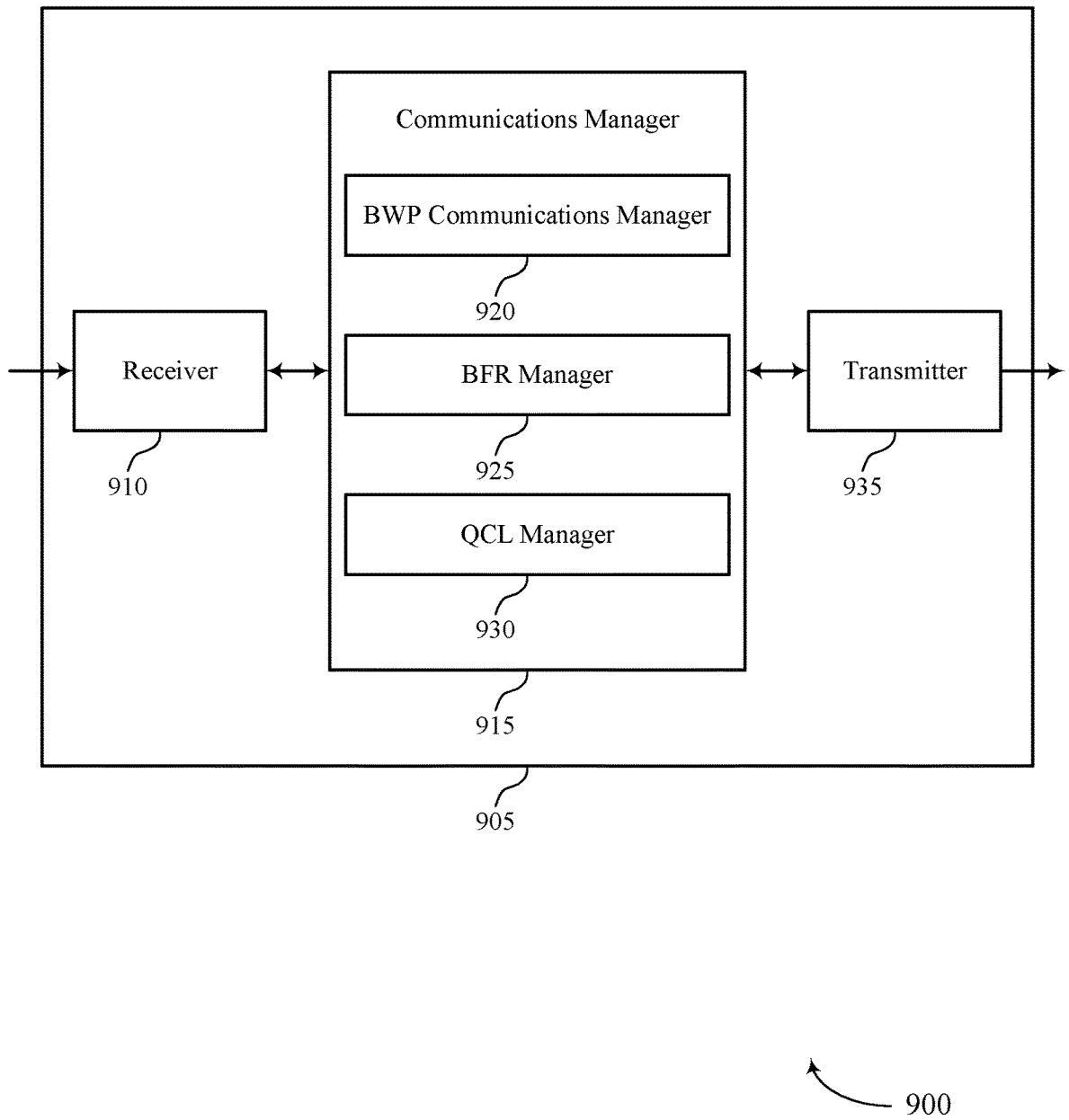

FIG. 9 shows a block diagram 900 of a device 905 that supports beam management for a BWP not including an SSB in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to beam management for a BWP not including an SSB, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a BWP communications manager 920, a BFR manager 925, and a QCL manager 930. The communications manager 915 may be an example of aspects of the communications manager 1110 described herein.

The BWP communications manager 920 may communicate with a base station over a first BWP of a carrier and set a beam for communicating with the base station over the first BWP based on the measuring.

The BFR manager 925 may receive a BFR configuration signal configuring a set of periodic CSI-RSs in the first BWP and a set of synchronization signals in a second BWP and measure the set of periodic CSI-RSs in the first BWP.

The BWP communications manager 920 may communicate with a base station over a first BWP of a carrier and determine a beam for communicating with the base station over the first BWP based on the measuring.

The QCL manager 930 may receive a signal configuring a set of periodic CSI-RSs for the first BWP of the carrier, where each periodic CSI-RS of the set of periodic CSI-RSs is spatially quasi-collocated with a synchronization signal in a second BWP, and measure the set of periodic CSI-RSs in the first BWP based on the set of periodic CSI-RSs being spatially quasi-collocated with the synchronization signal in the second BWP.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
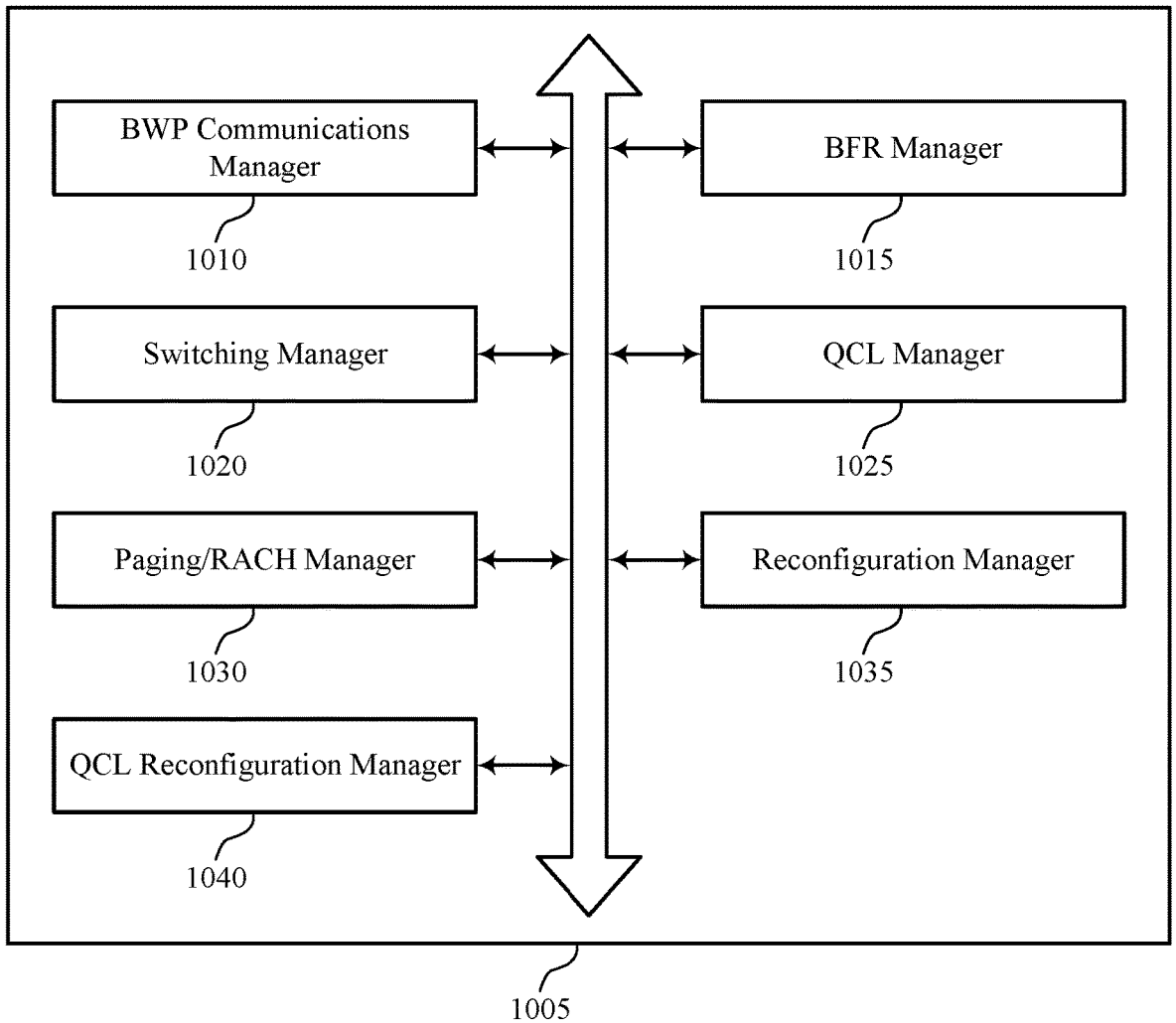
FIG. 10 shows a block diagram of a communications manager that supports beam management for a BWP not including an SSB in accordance with aspects of the present disclosure.

FIG. 10 shows a block diagram 1000 of a communications manager 1005 that supports beam management for a BWP not including an SSB in accordance with aspects of the present disclosure. The communications manager 1005 may be an example of aspects of a communications manager 815, a communications manager 915, or a communications manager 1110 described herein. The communications manager 1005 may include a BWP communications manager 1010, a BFR manager 1015, a switching manager 1020, a QCL manager 1025, a paging/RACH manager 1030, a reconfiguration manager 1035, and a QCL reconfiguration manager 1040. Each of these modules may communicate, directly or indirectly, with one another (e.g., via one or more buses).

The BWP communications manager 1010 may communicate with a base station over a first BWP of a carrier. In some examples, the BWP communications manager 1010 may set a beam for communicating with the base station over the first BWP based on the measuring. In some cases, the synchronization signal includes an SSB in the second BWP. In some cases, the first BWP is non-overlapping with the second BWP. In some cases, the UE includes a reduced bandwidth capability and supports communicating with the base station using only one BWP.

The BFR manager 1015 may receive a BFR configuration signal configuring a set of periodic CSI-RSs in the first BWP and a set of synchronization signals in a second BWP. In some examples, the BFR manager 1015 may measure the set of periodic CSI-RSs in the first BWP.

The QCL manager 1025 may receive a signal configuring a set of periodic CSI-RSs for the first BWP of the carrier, where each periodic CSI-RS of the set of periodic CSI-RSs is spatially quasi-collocated with a synchronization signal in a second BWP. In some examples, the QCL manager 1025 may measure the set of periodic CSI-RSs in the first BWP based on the set of periodic CSI-RSs being spatially quasi-collocated with the synchronization signal in the second BWP.

The switching manager 1020 may determine, based on the measuring, that a performance metric of the set of periodic CSI-RSs fails to satisfy a threshold. In some examples, the switching manager 1020 may initiate, based on the performance metric failing to satisfy the threshold, a switch to the second BWP.

In some examples, the switching manager 1020 may measure the set of synchronization signals in the second BWP. In some examples, the switching manager 1020 may determine a synchronization signal in the set of synchronization signals has a performance metric satisfying the performance metric threshold. In some examples, the switching manager 1020 may transmit a contention free random access in the first BWP for a BFR request based on a beam index of the synchronization signal.

The paging/RACH manager 1030 may identify, based on the set of periodic CSI-RSs being spatially quasi-collocated with the synchronization signal, at least one of a paging resource, or a random access resource, or a combination thereof.

The reconfiguration manager 1035 may receive a reconfiguration signal reconfiguring the set of periodic CSI-RSs to be spatially quasi-collocated with a different synchronization signal in the second BWP. In some examples, the reconfiguration manager 1035 may set the beam for communicating with the base station over the first BWP based on the reconfiguration signal. In some examples, the reconfiguration manager 1035 may transmit a capability signal to the base station indicating support for updating the spatial quasi-collocation association for the set of periodic CSI-RSs.

The QCL reconfiguration manager 1040 may determine that the set of periodic CSI-RSs in the first BWP are not spatially quasi-collocated with (e.g., are spatially separate from) the synchronization signal(s) in the second BWP. In some examples, the QCL reconfiguration manager 1040 may receive a configuration signal configuring an association between the set of periodic CSI-RSs and at least one of a set of paging resources, or a set of random access resources, or a combination thereof. In some examples, the QCL reconfiguration manager 1040 may identify, based on a beam index associated with a CSI-RS in the set of periodic CSI-RSs, at least one of a paging resource, or a random access resource, or a combination thereof.

Figure 11:
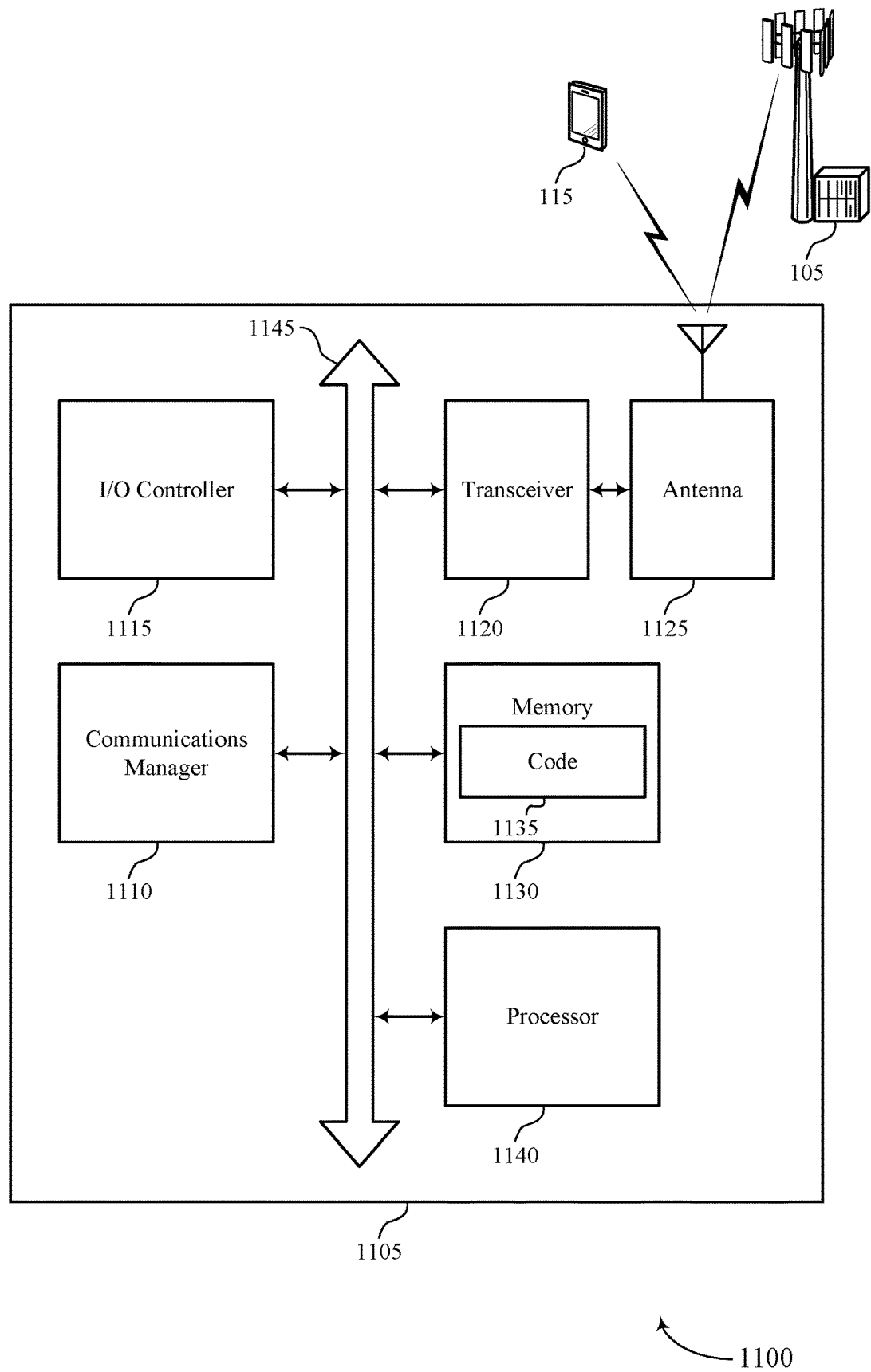
FIG. 11 shows a diagram of a system including a device that supports beam management for a BWP not including an SSB in accordance with aspects of the present disclosure.

FIG. 11 shows a diagram of a system 1100 including a device 1105 that supports beam management for a BWP not including an SSB in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may communicate with a base station over a first BWP of a carrier, set a beam for communicating with the base station over the first BWP based on the measuring, receive a BFR configuration signal configuring a set of periodic CSI-RSs in the first BWP and a set of synchronization signals in a second BWP, and measure the set of periodic CSI-RSs in the first BWP. The communications manager 1110 may also communicate with a base station over a first BWP of a carrier, determine a beam for communicating with the base station over the first BWP based on the measuring, receive a signal configuring a set of periodic CSI-RSs for the first BWP of the carrier, where each periodic CSI-RS of the set of periodic CSI-RSs is spatially quasi-collocated with a synchronization signal in a second BWP, and measure the set of periodic CSI-RSs in the first BWP based on the set of periodic CSI-RSs being spatially quasi-collocated with the synchronization signal in the second BWP.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam management for a BWP not including an SSB).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
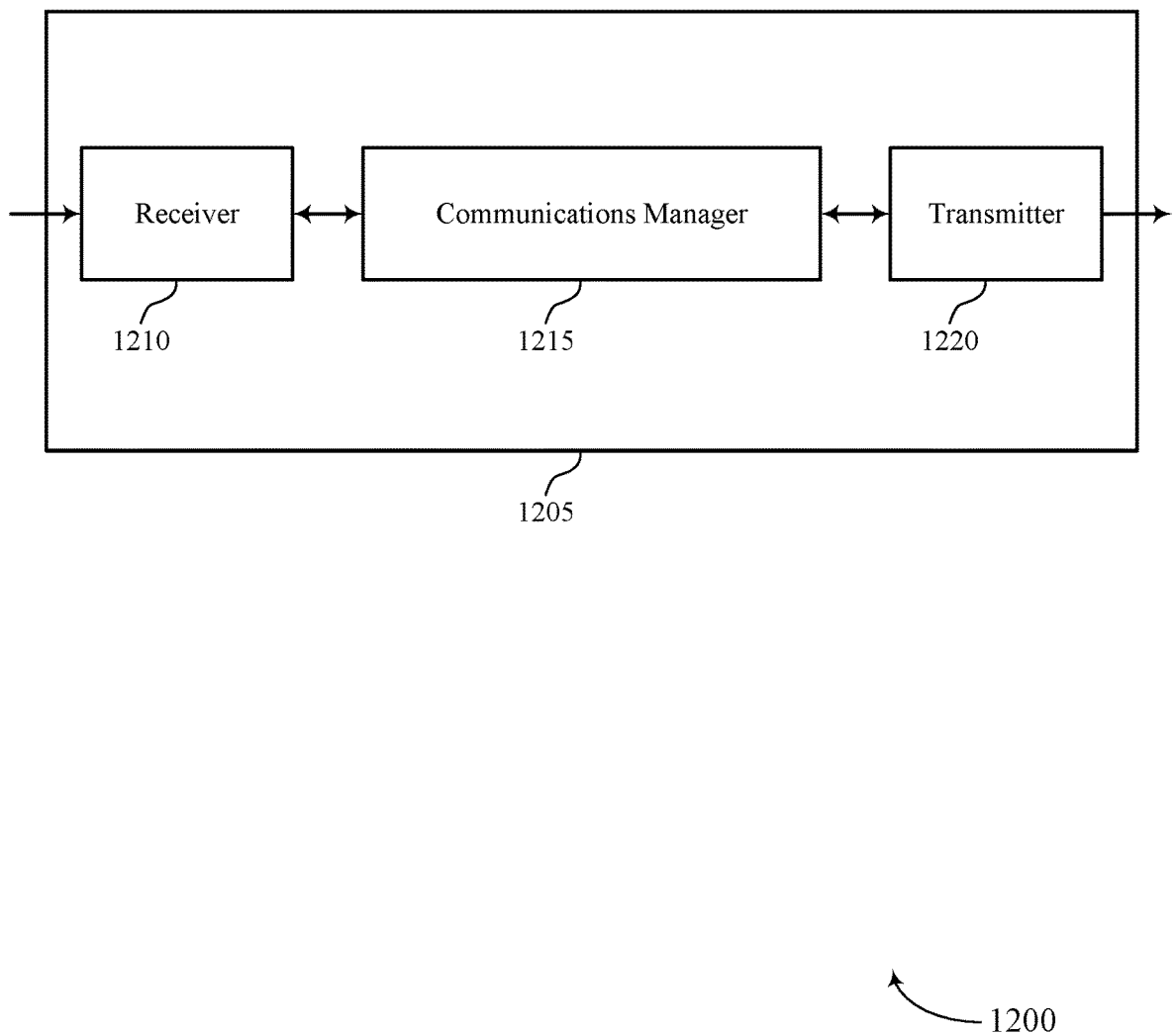
FIGS. 12 and 13 show block diagrams of devices that support beam management for a BWP not including an SSB in accordance with aspects of the present disclosure.

FIG. 12 shows a block diagram 1200 of a device 1205 that supports beam management for a BWP not including an SSB in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to beam management for a BWP not including an SSB, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may communicate with a UE over a first BWP of a carrier, set a beam for communicating with the UE over the first BWP based on the measurement report, transmit a BFR configuration signal configuring a set of periodic CSI-RSs in the first BWP and a set of synchronization signals in a second BWP, transmit the set of periodic CSI-RSs in the first BWP, and receive a measurement report from the UE indicating a beam index associated with a synchronization signal of the set of synchronization signals. The communications manager 1215 may also communicate with a UE over a first BWP of a carrier, determine a beam for communicating with the UE over the first BWP based on the measurement report, transmit a signal configuring a set of periodic CSI-RSs for the first BWP of the carrier, where each periodic CSI-RS of the set of periodic CSI-RSs is spatially quasi-collocated with a synchronization signal in a second BWP, and receive a measurement report from the UE indicating a beam index associated with a CSI-RS in the set of periodic CSI-RSs in the first BWP. The communications manager 1215 may be an example of aspects of the communications manager 1510 described herein.

The communications manager 1215, or its sub-components, may be implemented in hardware, software (e.g., executed by a processor), or any combination thereof. If implemented in code executed by a processor, the functions of the communications manager 1215, or its sub-components, may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
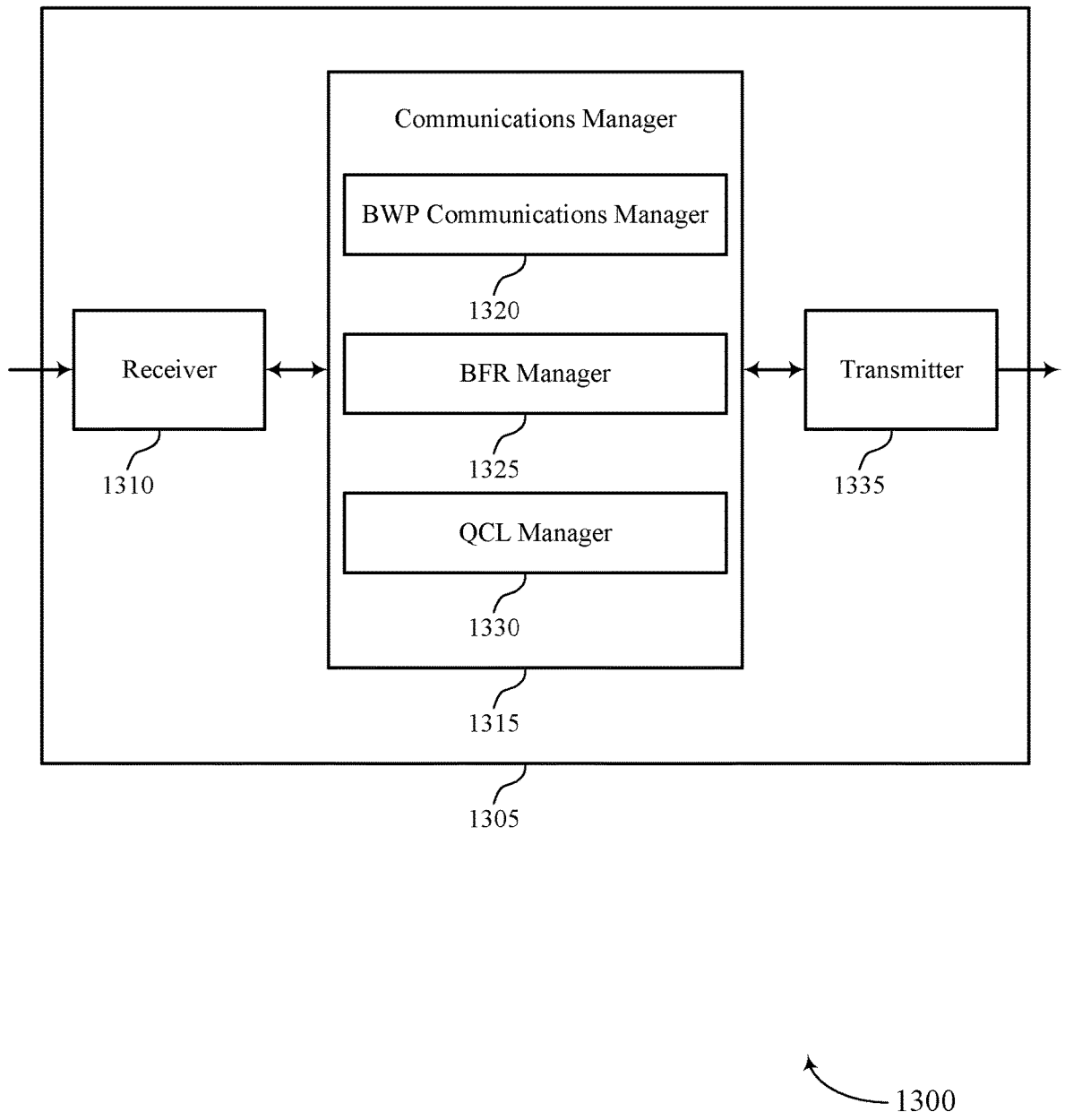

FIG. 13 shows a block diagram 1300 of a device 1305 that supports beam management for a BWP not including an SSB in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to beam management for a BWP not including an SSB, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a BWP communications manager 1320, a BFR manager 1325, and a QCL manager 1330. The communications manager 1315 may be an example of aspects of the communications manager 1510 described herein.

The BWP communications manager 1320 may communicate with a UE over a first BWP of a carrier and set a beam for communicating with the UE over the first BWP based on the measurement report.

The BFR manager 1325 may transmit a BFR configuration signal configuring a set of periodic CSI-RSs in the first BWP and a set of synchronization signals in a second BWP, transmit the set of periodic CSI-RSs in the first BWP, and receive a measurement report from the UE indicating a beam index associated with a synchronization signal of the set of synchronization signals.

The BWP communications manager 1320 may communicate with a UE over a first BWP of a carrier and determine a beam for communicating with the UE over the first BWP based on the measurement report.

The QCL manager 1330 may transmit a signal configuring a set of periodic CSI-RSs for the first BWP of the carrier, where each periodic CSI-RS of the set of periodic CSI-RSs is spatially quasi-collocated with a synchronization signal in a second BWP and receive a measurement report from the UE indicating a beam index associated with a CSI-RS in the set of periodic CSI-RSs in the first BWP.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
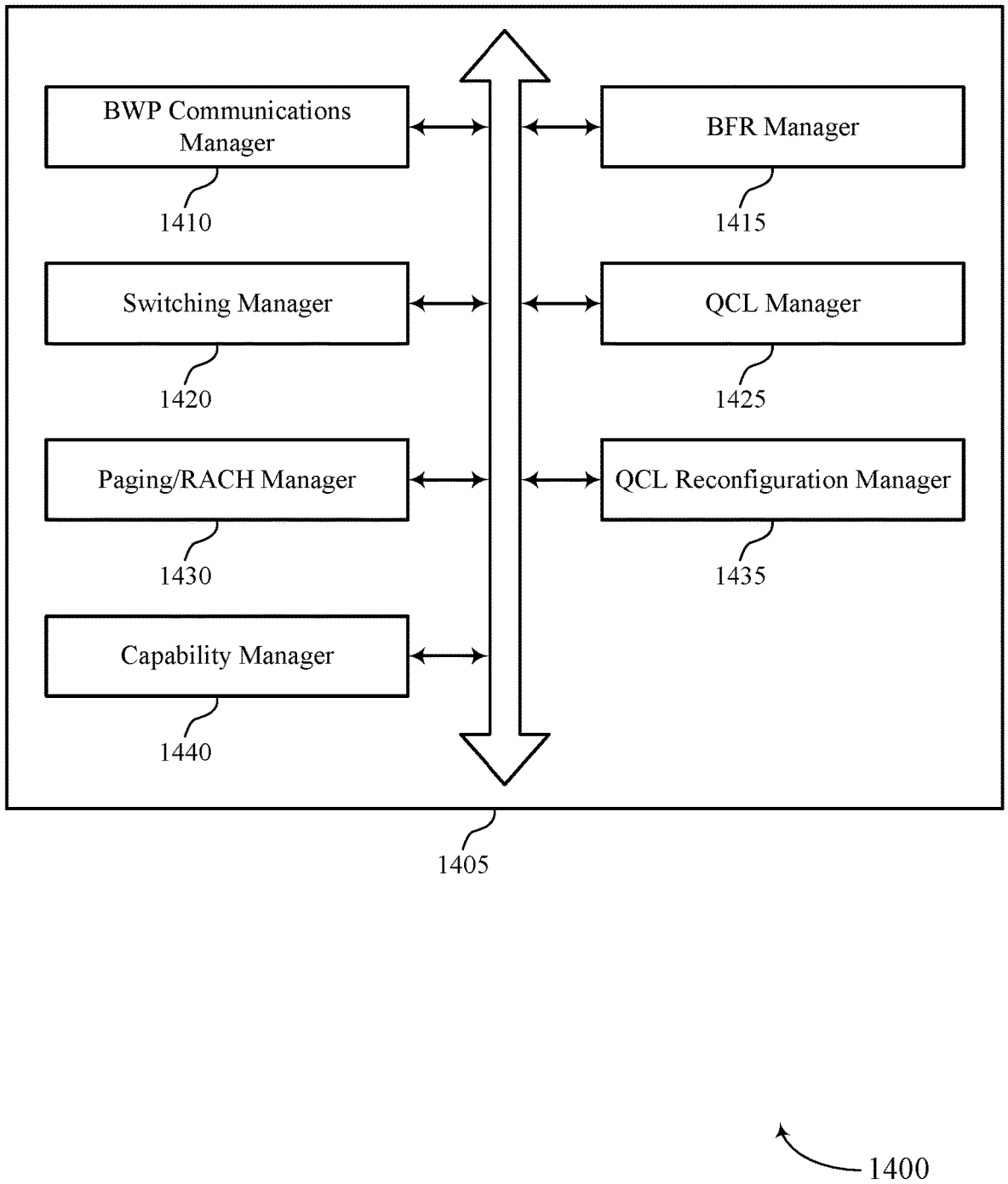
FIG. 14 shows a block diagram of a communications manager that supports beam management for a BWP not including an SSB in accordance with aspects of the present disclosure.

FIG. 14 shows a block diagram 1400 of a communications manager 1405 that supports beam management for a BWP not including an SSB in accordance with aspects of the present disclosure. The communications manager 1405 may be an example of aspects of a communications manager 1215, a communications manager 1315, or a communications manager 1510 described herein. The communications manager 1405 may include a BWP communications manager 1410, a BFR manager 1415, a switching manager 1420, a QCL manager 1425, a paging/RACH manager 1430, a QCL reconfiguration manager 1435, and a capability manager 1440. Each of these modules may communicate, directly or indirectly, with one another (e.g., via one or more buses).

The BWP communications manager 1410 may communicate with a UE over a first BWP of a carrier.

The BFR manager 1415 may transmit a BFR configuration signal configuring a set of periodic CSI-RSs in the first BWP and a set of synchronization signals in a second BWP. In some examples, the BFR manager 1415 may transmit the set of periodic CSI-RSs in the first BWP. In some examples, the BFR manager 1415 may receive a measurement report from the UE indicating a beam index associated with a synchronization signal of the set of synchronization signals.

In some examples, the BWP communications manager 1410 may set a beam for communicating with the UE over the first BWP based on the measurement report.

The QCL manager 1425 may transmit a signal configuring a set of periodic CSI-RSs for the first BWP of the carrier, where each periodic CSI-RS of the set of periodic CSI-RSs is spatially quasi-collocated with a synchronization signal in a second BWP. In some examples, the QCL manager 1425 may receive a measurement report from the UE indicating a beam index associated with a CSI-RS in the set of periodic CSI-RSs in the first BWP.

The switching manager 1420 may configure a threshold associated with a performance metric of the set of periodic CSI-RSs. In some examples, the switching manager 1420 may initiate, based on the performance metric failing to satisfy the threshold, a switch to the second BWP. In some examples, the switching manager 1420 may transmit the set of synchronization signals in the second BWP. In some examples, the switching manager 1420 may receive a contention free random access in the first BWP for a BFR request indicating a beam index of a synchronization signal in the set of synchronization signals. In some cases, the first BWP is non-overlapping with the second BWP.

In some examples, the switching manager 1420 may reset a beam for communicating with the UE over the first BWP based on the beam index of the synchronization signal.

The paging/RACH manager 1430 may identify, based on the set of periodic CSI-RSs being spatially quasi-collocated with the synchronization signal, at least one of a paging resource, or a random access resource, or a combination thereof, to use for communicating with the UE.

The QCL reconfiguration manager 1435 may transmit a reconfiguration signal reconfiguring the set of periodic CSI-RSs to be spatially quasi-collocated with a different synchronization signal in the second BWP. In some examples, the QCL reconfiguration manager 1435 may set the beam for communicating with the base station over the first BWP based on the reconfiguration signal. In some examples, the QCL reconfiguration manager 1435 may determine that the set of periodic CSI-RSs in the first BWP are not spatially quasi-collocated with the synchronization signal in the second BWP. In some examples, the QCL reconfiguration manager 1435 may transmit a configuration signal configuring an association between the set of periodic CSI-RSs and at least one of a set of paging resources, or a set of random access resources, or a combination thereof. In some examples, the QCL reconfiguration manager 1435 may identify, based on a beam index associated with a CSI-RS of the set of periodic CSI-RSs, at least one of a paging resource, or a random access resource, or a combination thereof.

The capability manager 1440 may receive a capability signal from the UE indicating support for updating the spatial quasi-collocation association for the set of periodic CSI-RSs.

Figure 15:
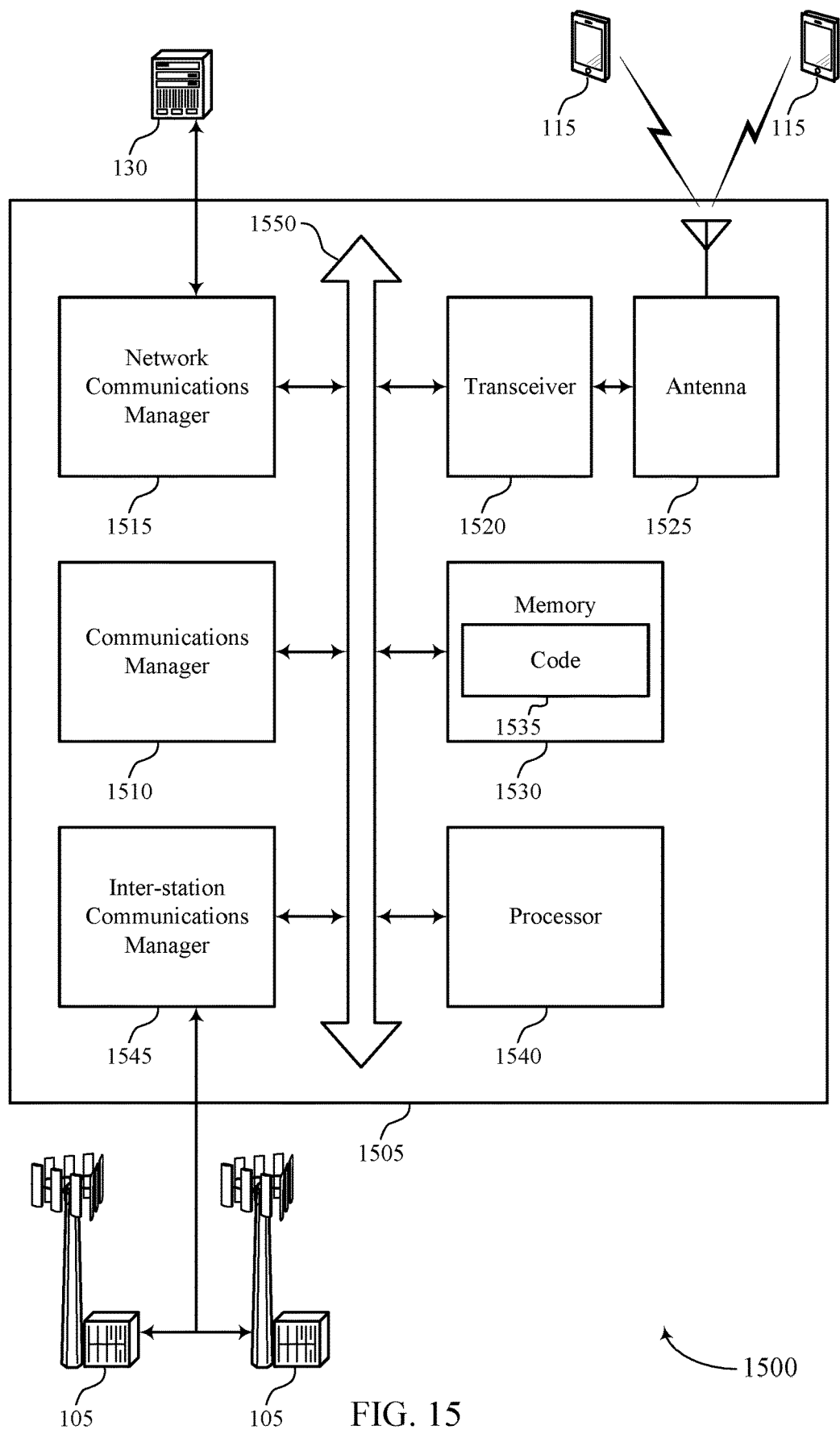
FIG. 15 shows a diagram of a system including a device that supports beam management for a BWP not including an SSB in accordance with aspects of the present disclosure.

FIG. 15 shows a diagram of a system 1500 including a device 1505 that supports beam management for a BWP not including an SSB in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may communicate with a UE over a first BWP of a carrier, set a beam for communicating with the UE over the first BWP based on the measurement report, transmit a BFR configuration signal configuring a set of periodic CSI-RSs in the first BWP and a set of synchronization signals in a second BWP, transmit the set of periodic CSI-RSs in the first BWP, and receive a measurement report from the UE indicating a beam index associated with a synchronization signal of the set of synchronization signals. The communications manager 1510 may also communicate with a UE over a first BWP of a carrier, determine a beam for communicating with the UE over the first BWP based on the measurement report, transmit a signal configuring a set of periodic CSI-RSs for the first BWP of the carrier, where each periodic CSI-RS of the set of periodic CSI-RSs is spatially quasi-collocated with a synchronization signal in a second BWP, and receive a measurement report from the UE indicating a beam index associated with a CSI-RS in the set of periodic CSI-RSs in the first BWP.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting beam management for a BWP not including an SSB).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
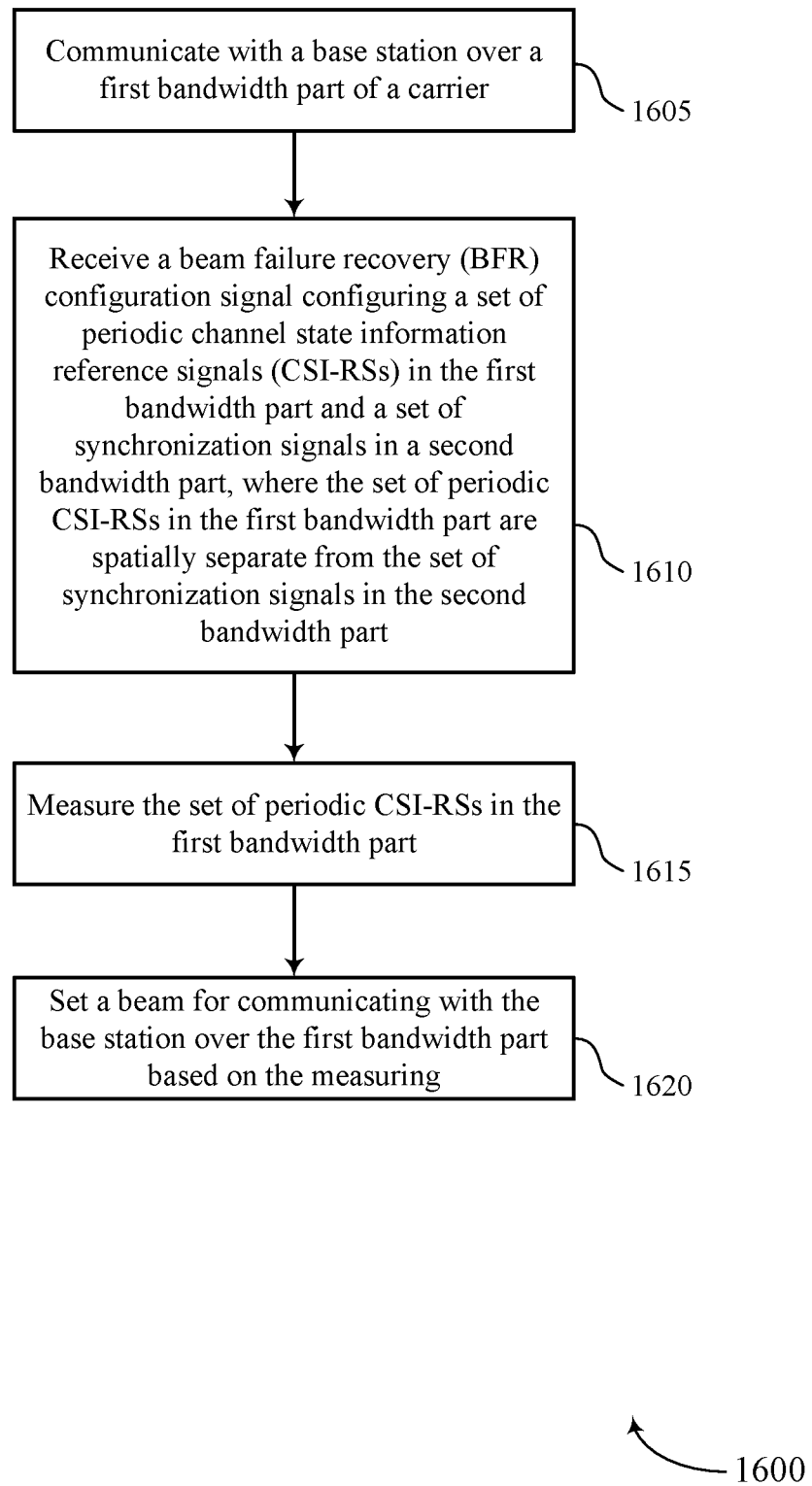
FIGS. 16 through 19 show flowcharts illustrating methods that support beam management for a BWP not including an SSB in accordance with aspects of the present disclosure.

FIG. 16 shows a flowchart illustrating a method 1600 that supports beam management for a BWP not including an SSB in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may communicate with a base station over a first BWP of a carrier. The operations of 1605 may be performed according to the methods described herein. In some examples, aspects of the operations of 1605 may be performed by a BWP communications manager as described with reference to FIGS. 8 through 11.

At 1610, the UE may receive a BFR configuration signal configuring a set of periodic CSI-RSs in the first BWP and a set of synchronization signals in a second BWP, where the set of periodic CSI-RSs in the first bandwidth part are spatially separate from the set of synchronization signals in the second bandwidth part. The operations of 1610 may be performed according to the methods described herein. In some examples, aspects of the operations of 1610 may be performed by a BFR manager as described with reference to FIGS. 8 through 11.

At 1615, the UE may measure the set of periodic CSI-RSs in the first BWP. The operations of 1615 may be performed according to the methods described herein. In some examples, aspects of the operations of 1615 may be performed by a BFR manager as described with reference to FIGS. 8 through 11.

At 1620, the UE may set a beam for communicating with the base station over the first BWP based on the measuring. The operations of 1620 may be performed according to the methods described herein. In some examples, aspects of the operations of 1620 may be performed by a BWP communications manager as described with reference to FIGS. 8 through 11.

Figure 17:
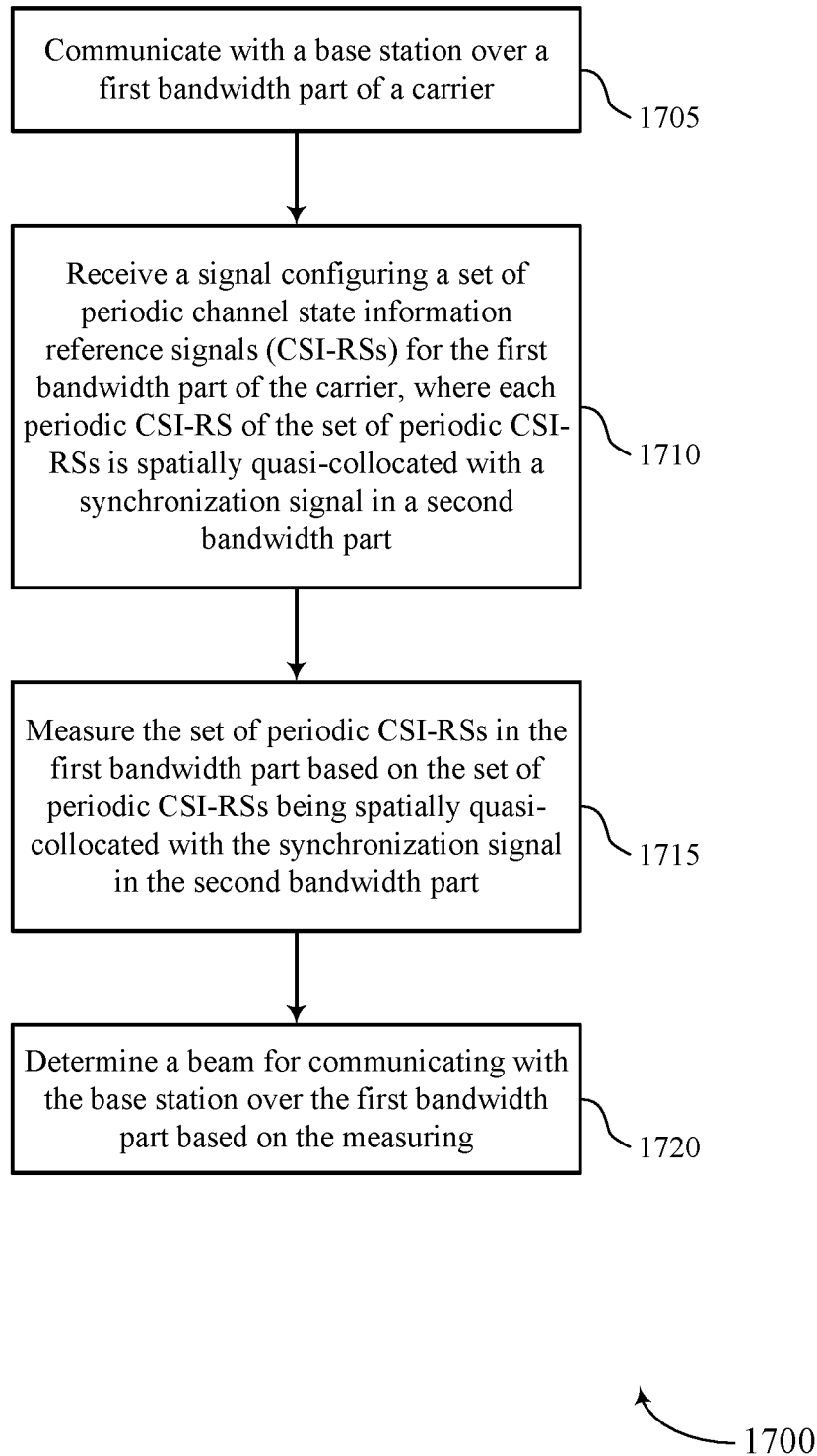

FIG. 17 shows a flowchart illustrating a method 1700 that supports beam management for a BWP not including an SSB in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may communicate with a base station over a first BWP of a carrier. The operations of 1705 may be performed according to the methods described herein. In some examples, aspects of the operations of 1705 may be performed by a BWP communications manager as described with reference to FIGS. 8 through 11.

At 1710, the UE may receive a signal configuring a set of periodic CSI-RSs for the first BWP of the carrier, where each periodic CSI-RS of the set of periodic CSI-RSs is spatially quasi-collocated with a synchronization signal in a second BWP. The operations of 1710 may be performed according to the methods described herein. In some examples, aspects of the operations of 1710 may be performed by a QCL manager as described with reference to FIGS. 8 through 11.

At 1715, the UE may measure the set of periodic CSI-RSs in the first BWP based on the set of periodic CSI-RSs being spatially quasi-collocated with the synchronization signal in the second BWP. The operations of 1715 may be performed according to the methods described herein. In some examples, aspects of the operations of 1715 may be performed by a QCL manager as described with reference to FIGS. 8 through 11.

At 1720, the UE may determine a beam for communicating with the base station over the first BWP based on the measuring. The operations of 1720 may be performed according to the methods described herein. In some examples, aspects of the operations of 1720 may be performed by a BWP communications manager as described with reference to FIGS. 8 through 11.

Figure 18:
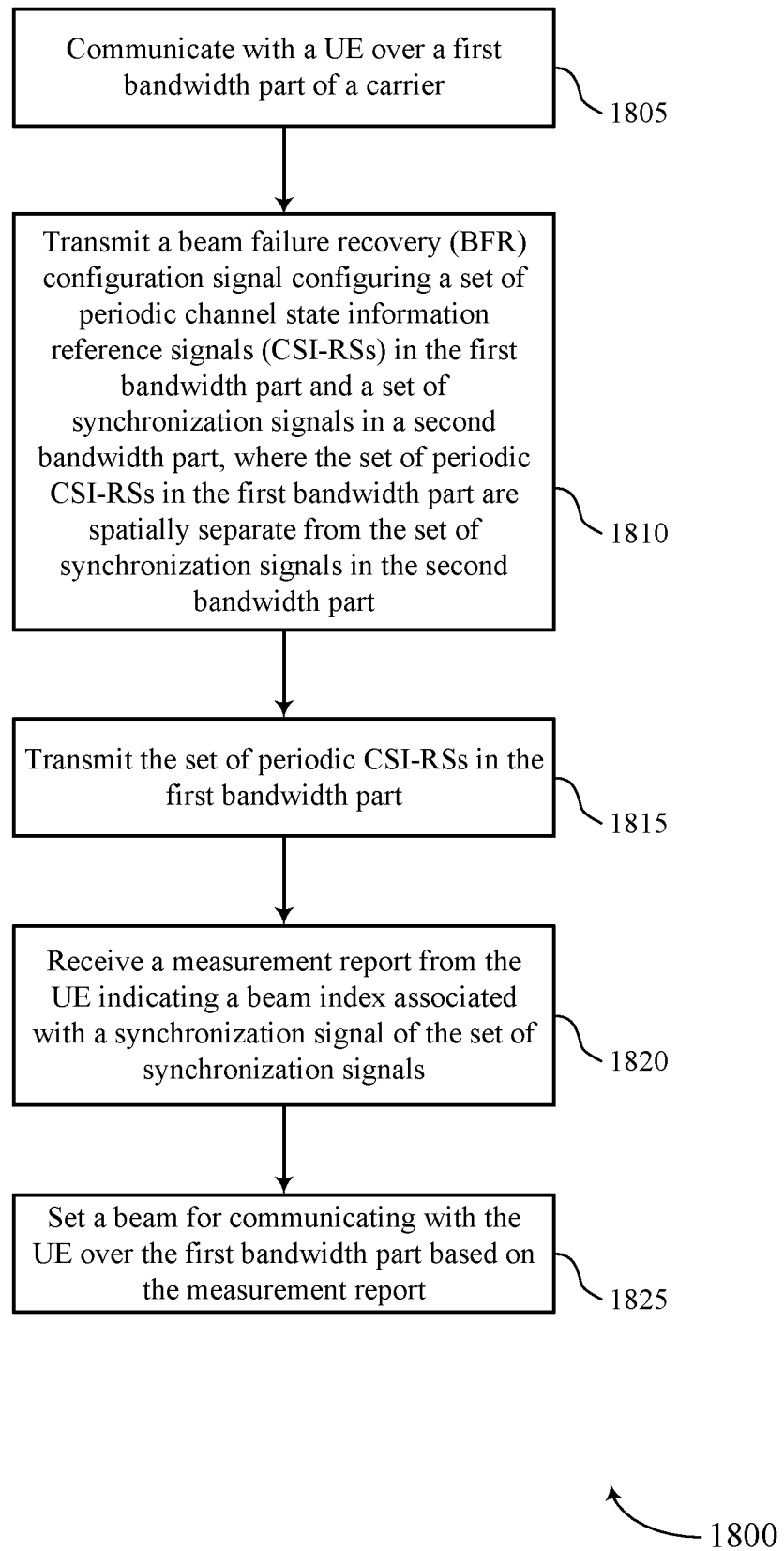

FIG. 18 shows a flowchart illustrating a method 1800 that supports beam management for a BWP not including an SSB in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may communicate with a UE over a first BWP of a carrier. The operations of 1805 may be performed according to the methods described herein. In some examples, aspects of the operations of 1805 may be performed by a BWP communications manager as described with reference to FIGS. 12 through 15.

At 1810, the base station may transmit a BFR configuration signal configuring a set of periodic CSI-RSs in the first BWP and a set of synchronization signals in a second BWP, where the set of periodic CSI-RSs in the first bandwidth part are spatially separate from the set of synchronization signals in the second bandwidth part. The operations of 1810 may be performed according to the methods described herein. In some examples, aspects of the operations of 1810 may be performed by a BFR manager as described with reference to FIGS. 12 through 15.

At 1815, the base station may transmit the set of periodic CSI-RSs in the first BWP. The operations of 1815 may be performed according to the methods described herein. In some examples, aspects of the operations of 1815 may be performed by a BFR manager as described with reference to FIGS. 12 through 15.

At 1820, the base station may receive a measurement report from the UE indicating a beam index associated with a synchronization signal of the set of synchronization signals. The operations of 1820 may be performed according to the methods described herein. In some examples, aspects of the operations of 1820 may be performed by a BFR manager as described with reference to FIGS. 12 through 15.

At 1825, the base station may set a beam for communicating with the UE over the first BWP based on the measurement report. The operations of 1825 may be performed according to the methods described herein. In some examples, aspects of the operations of 1825 may be performed by a BWP communications manager as described with reference to FIGS. 12 through 15.

Figure 19:
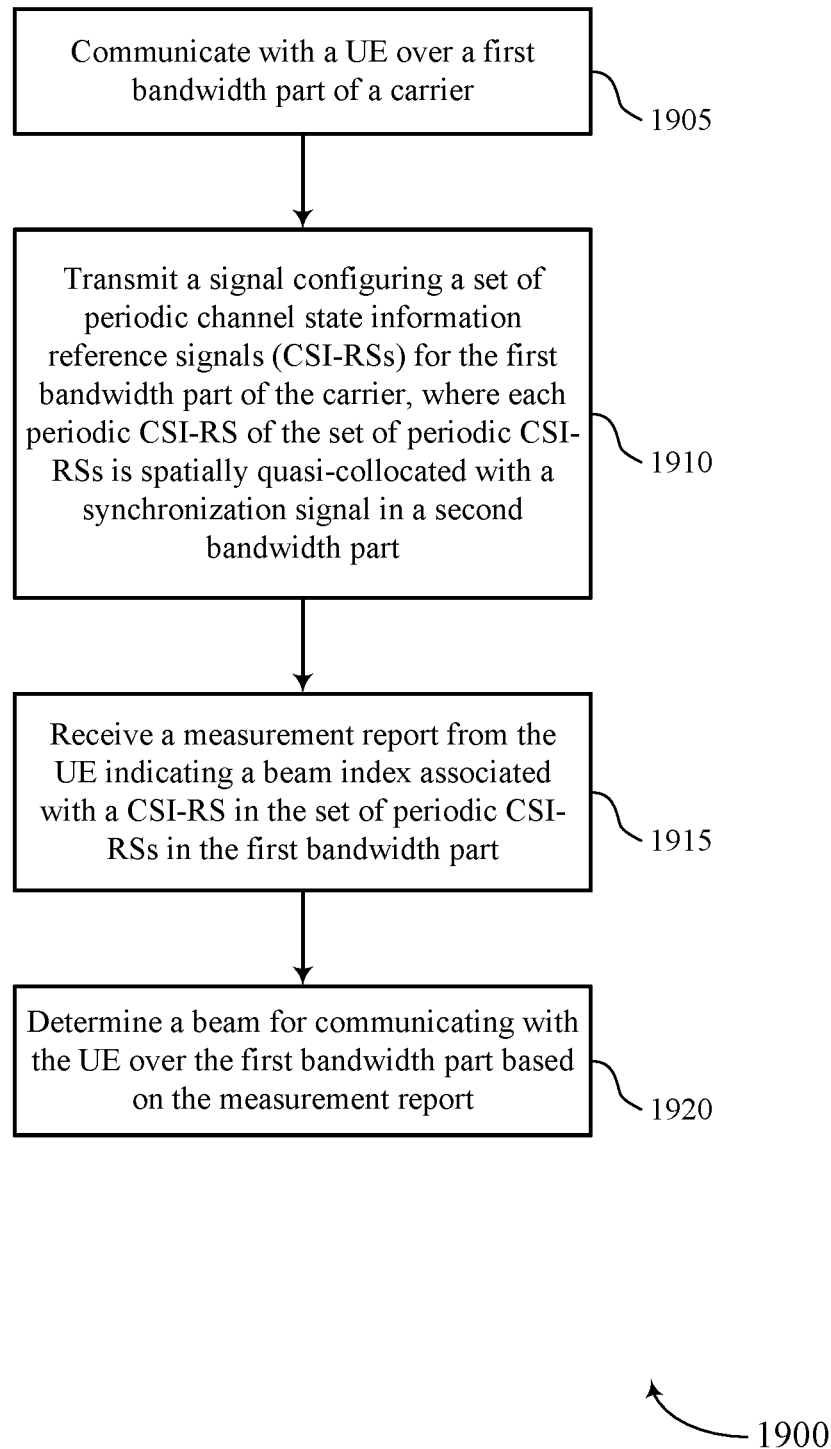

FIG. 19 shows a flowchart illustrating a method 1900 that supports beam management for a BWP not including an SSB in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may communicate with a UE over a first BWP of a carrier. The operations of 1905 may be performed according to the methods described herein. In some examples, aspects of the operations of 1905 may be performed by a BWP communications manager as described with reference to FIGS. 12 through 15.

At 1910, the base station may transmit a signal configuring a set of periodic CSI-RSs for the first BWP of the carrier, where each periodic CSI-RS of the set of periodic CSI-RSs is spatially quasi-collocated with a synchronization signal in a second BWP. The operations of 1910 may be performed according to the methods described herein. In some examples, aspects of the operations of 1910 may be performed by a QCL manager as described with reference to FIGS. 12 through 15.

At 1915, the base station may receive a measurement report from the UE indicating a beam index associated with a CSI-RS in the set of periodic CSI-RSs in the first BWP. The operations of 1915 may be performed according to the methods described herein. In some examples, aspects of the operations of 1915 may be performed by a QCL manager as described with reference to FIGS. 12 through 15.

At 1920, the base station may determine a beam for communicating with the UE over the first BWP based on the measurement report. The operations of 1920 may be performed according to the methods described herein. In some examples, aspects of the operations of 1920 may be performed by a BWP communications manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). A base station for a macro cell may be referred to as a macro base station (e.g., macro eNB). A base station for a small cell may be referred to as a small cell base station (e.g., small cell eNB), a pico base station (e.g., pico eNB), a femto base station (e.g., femto eNB), or a home base station (e.g., home eNB). A base station may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   communicating with a base station over a first bandwidth part of a carrier;
   receiving a beam failure recovery (BFR) configuration signal configuring a set of periodic channel state information reference signals (CSI-RSs) in the first bandwidth part and a set of synchronization signals in a second bandwidth part, wherein the set of periodic CSI-RSs in the first bandwidth part are spatially separate from the set of synchronization signals in the second bandwidth part;
   measuring the set of periodic CSI-RSs in the first bandwidth part; and
   setting a beam for communicating with the base station over the first bandwidth part based at least in part on the measuring.

2. The method of claim 1, further comprising:
   determining, based at least in part on the measuring, that a performance metric of the set of periodic CSI-RSs fails to satisfy a threshold; and
   initiating, based at least in part on the performance metric failing to satisfy the threshold, a switch to the second bandwidth part.

3. The method of claim 2, further comprising:
   measuring the set of synchronization signals in the second bandwidth part;
   determining that a synchronization signal in the set of synchronization signals has a performance metric satisfying a performance metric threshold; and transmitting a contention free random access in the first bandwidth part for a BFR request based at least in part on a beam index of the synchronization signal.

4. The method of claim 1, wherein the set of synchronization signals in the second bandwidth part comprises a synchronization signal block (SSB).

5. The method of claim 1, wherein the first bandwidth part is non-overlapping with the second bandwidth part.

6. The method of claim 1, wherein the UE comprises a reduced bandwidth capability and supports communicating with the base station using only one bandwidth part.

7. A method for wireless communication at a user equipment (UE), comprising:
communicating with a base station over a first bandwidth part of a carrier;
receiving a signal configuring a set of periodic channel state information reference signals (CSI-RSs) for the first bandwidth part of the carrier, wherein each periodic CSI-RS of the set of periodic CSI-RSs is spatially quasi-collocated with a synchronization signal in a second bandwidth part;
measuring the set of periodic CSI-RSs in the first bandwidth part based at least in part on the set of periodic CSI-RSs being spatially quasi-collocated with the synchronization signal in the second bandwidth part;
determining a beam for communicating with the base station over the first bandwidth part based at least in part on the measuring;
determining that the set of periodic CSI-RSs in the first bandwidth part are not spatially quasi-collocated with the synchronization signal in the second bandwidth part;
receiving a configuration signal configuring an association between the set of periodic CSI-RSs and at least one of a set of paging resources, or a set of random access resources, or a combination thereof; and
identifying, based at least in part on a beam index associated with a CSI-RS in the set of periodic CSI-RSs, at least one of a paging resource, or a random access resource, or a combination thereof.

8. The method of claim 7, wherein the at least one of the paging resource or the random access resource, or the combination thereof is identified further based at least in part on the set of periodic CSI-RSs being spatially quasi-collocated with the synchronization signal.

9. The method of claim 7, further comprising:
receiving a reconfiguration signal reconfiguring the set of periodic CSI-RSs to be spatially quasi-collocated with a different synchronization signal in the second bandwidth part; and
setting the beam for communicating with the base station over the first bandwidth part based at least in part on the reconfiguration signal.

10. The method of claim 9, further comprising:
transmitting a capability signal to the base station indicating support for updating a spatial quasi-collocation association for the set of periodic CSI-RSs.

11. The method of claim 7, wherein the synchronization signal in the second bandwidth part comprises a synchronization signal block (SSB).

12. The method of claim 7, wherein the first bandwidth part is non-overlapping with the second bandwidth part.

13. The method of claim 7, wherein the UE comprises a reduced bandwidth capability and supports communicating with the base station using a single bandwidth part.

14. A method for wireless communication at a base station, comprising:
communicating with a user equipment (UE) over a first bandwidth part of a carrier;
transmitting a beam failure recovery (BFR) configuration signal configuring a set of periodic channel state information reference signals (CSI-RSs) in the first bandwidth part and a set of synchronization signals in a second bandwidth part, wherein the set of periodic CSI-RSs in the first bandwidth part are spatially separate from the set of synchronization signals in the second bandwidth part;
transmitting the set of periodic CSI-RSs in the first bandwidth part and the set of synchronization signals in the second bandwidth part;
receiving a measurement report from the UE indicating a beam index associated with a periodic CSI-RSI of the set of periodic CSI-RSs; and
setting a beam for communicating with the UE over the first bandwidth part based at least in part on the measurement report.

15. The method of claim 14, further comprising:
receiving a contention free random access in the first bandwidth part for a BFR request indicating a beam index of a synchronization signal in the set of synchronization signals.

16. The method of claim 14, further comprising:
resetting a beam for communicating with the UE over the first bandwidth part based at least in part on the beam index of the synchronization signal.

17. The method of claim 14, wherein the set of synchronization signals in the second bandwidth part comprises a synchronization signal block (SSB).

18. The method of claim 14, wherein the first bandwidth part is non-overlapping with the second bandwidth part.

19. A method for wireless communication at a base station, comprising:
communicating with a user equipment (UE) over a first bandwidth part of a carrier;
transmitting a signal configuring a set of periodic channel state information reference signals (CSI-RSs) for the first bandwidth part of the carrier, wherein each periodic CSI-RS of the set of periodic CSI-RSs is spatially quasi-collocated with a synchronization signal in a second bandwidth part;
receiving a measurement report from the UE indicating a beam index associated with a CSI-RS in the set of periodic CSI-RSs in the first bandwidth part;
determining a beam for communicating with the UE over the first bandwidth part based at least in part on the measurement report;
determining that the set of periodic CSI-RSs in the first bandwidth part are not spatially quasi-collocated with the synchronization signal in the second bandwidth part;
transmitting a configuration signal configuring an association between the set of periodic CSI-RSs and at least one of a set of paging resources, or a set of random access resources, or a combination thereof; and
identifying, based at least in part on a beam index associated with a CSI-RS of the set of periodic CSI-RSs, at least one of a paging resource, or a random access resource, or a combination thereof.

20. The method of claim 19, wherein the at least one of the paging resource, or the random access resource, or the combination thereof is identified further based at least in part on the set of periodic CSI-RSs being spatially quasi-collocated with the synchronization signal.

21. The method of claim 19, further comprising:
transmitting a reconfiguration signal reconfiguring the set of periodic CSI-RSs to be spatially quasi-collocated with a different synchronization signal in the second bandwidth part; and
setting the beam for communicating with the base station over the first bandwidth part based at least in part on the reconfiguration signal.

22. The method of claim 19, further comprising:
receiving a capability signal from the UE indicating support for updating a spatial quasi-collocation association for the set of periodic CSI-RSs.

23. The method of claim 19, wherein the synchronization signal in the second bandwidth part comprises a synchronization signal block (SSB).

24. The method of claim 19, wherein the first bandwidth part is non-overlapping with the second bandwidth part.

\* \* \* \* \*